(12) United States Patent
Inaba et al.

(10) Patent No.: US 10,032,279 B2
(45) Date of Patent: Jul. 24, 2018

(54) INFORMATION PROCESSING APPARATUS, INFORMATION PROCESSING METHOD, AND STORAGE MEDIUM

(71) Applicant: CANON KABUSHIKI KAISHA, Tokyo (JP)

(72) Inventors: Masaki Inaba, Tokyo (JP); Tomoaki Higo, Tokyo (JP)

(73) Assignee: CANON KABUSHIKI KAISHA, Tokyo (JP)

( * ) Notice: Subject to any disclaimer, the term of this patent is extended or adjusted under 35 U.S.C. 154(b) by 110 days.

(21) Appl. No.: 15/048,601

(22) Filed: Feb. 19, 2016

(65) Prior Publication Data
US 2016/0247287 A1    Aug. 25, 2016

(30) Foreign Application Priority Data

Feb. 23, 2015   (JP) ................................ 2015-033365
Feb. 23, 2015   (JP) ................................ 2015-033366

(51) Int. Cl.
    *G06K 9/00*      (2006.01)
    *G06T 7/00*      (2017.01)
    (Continued)

(52) U.S. Cl.
    CPC .............. *G06T 7/0057* (2013.01); *G06T 7/13* (2017.01); *G06T 7/521* (2017.01)

(58) Field of Classification Search
    CPC .. G03F 1/44; G07D 7/20; G05B 2219/37048; G01B 11/25; G01B 11/2513
(Continued)

(56) References Cited

U.S. PATENT DOCUMENTS

| 8,970,853 B2* | 3/2015 | Takabayashi .......... G01B 11/25 356/610 |
| 2007/0019166 A1* | 1/2007 | Iwasaki .................... F21K 9/00 353/34 |

(Continued)

FOREIGN PATENT DOCUMENTS

JP     2014-115264 A    6/2014

OTHER PUBLICATIONS

Salvi, Joaquim, et al. "A state of the art in structured light patterns for surface profilometry." Pattern recognition 43.8 (2010): 2666-2680.*

(Continued)

*Primary Examiner* — Aaron W Carter
(74) *Attorney, Agent, or Firm* — Canon U.S.A., Inc. IP Division

(57) ABSTRACT

An information processing apparatus includes an image acquisition unit configured to acquire an image obtained by imaging a target object onto which a pattern having a bright portion and a dark portion is projected by a projection unit, an allocation unit configured to allocate, to a pixel in the image, a label corresponding to luminance of the pixel by referring to a characteristic of the pattern, and a correspondence relationship derivation unit configured to derive a correspondence relationship between a position of the pattern in a projection plane of the projection unit and a position of the pattern in the acquired image and a three-dimensional coordinate derivation unit configured to derive three-dimensional coordinates of a surface of the target object based on the derived correspondence relationship.

18 Claims, 23 Drawing Sheets

(51) Int. Cl.
*G06T 7/521* (2017.01)
*G06T 7/13* (2017.01)

(58) Field of Classification Search
USPC .............................. 382/128, 154; 348/136
See application file for complete search history.

(56) References Cited

U.S. PATENT DOCUMENTS

| | | | | |
|---|---|---|---|---|
| 2007/0031029 | A1* | 2/2007 | Sasaki | G01B 11/25 |
| | | | | 382/154 |
| 2012/0089364 | A1* | 4/2012 | Takabayashi | G01B 11/2527 |
| | | | | 702/167 |
| 2013/0076896 | A1* | 3/2013 | Takabayashi | G01B 11/25 |
| | | | | 348/136 |
| 2013/0155417 | A1* | 6/2013 | Ohsawa | G01B 11/2536 |
| | | | | 356/610 |
| 2015/0109423 | A1* | 4/2015 | Shimodaira | H04N 13/0253 |
| | | | | 348/49 |
| 2015/0130906 | A1* | 5/2015 | Bridges | G01B 21/047 |
| | | | | 348/46 |
| 2015/0204662 | A1* | 7/2015 | Kobayashi | G01B 11/25 |
| | | | | 356/610 |
| 2015/0229907 | A1* | 8/2015 | Bridges | G01B 21/047 |
| | | | | 348/46 |
| 2015/0262411 | A1* | 9/2015 | Gordon | G01B 11/25 |
| | | | | 382/154 |
| 2015/0310663 | A1* | 10/2015 | Yamasaki | H04N 9/31 |
| | | | | 348/136 |
| 2015/0362312 | A1* | 12/2015 | Higo | G06T 7/586 |
| | | | | 356/610 |
| 2016/0054118 | A1* | 2/2016 | Fuchikami | G01B 11/2536 |
| | | | | 356/610 |
| 2016/0364872 | A1* | 12/2016 | Nakajima | G01B 11/25 |
| 2016/0364903 | A1* | 12/2016 | Gordon | G01B 11/25 |
| 2017/0102224 | A1* | 4/2017 | Bridges | G01B 11/005 |

OTHER PUBLICATIONS

Geng, Jason. "DLP-based structured light 3D imaging technologies and applications." Proc. SPIE. vol. 7932. 2011.*
Mohit Gupta et al., "Structured Light 3D Scanning in the Presence of Global Illumination", CVPR, 2011, pp. 713-720.
Mohit Gupta et al., "Structured Light in Sunlight", ICCV, 2013, 8 pages.

* cited by examiner

FIG. 8
COMPARISON IN THIN STRIPE
BETWEEN MMSW AND GRAY CODE
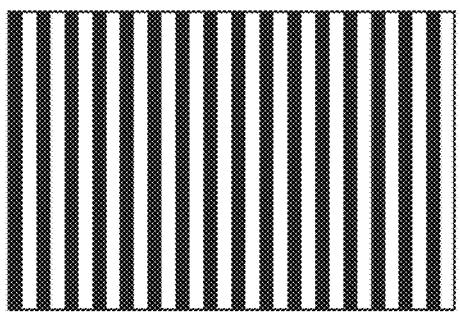
PART OF THINNEST STRIPED
PATTERN IN GRAY CODE
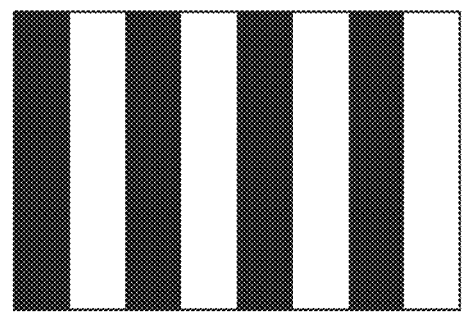
PART OF THINNEST STRIPED
PATTERN IN MMSW

FIG. 9

PROJECTION PIXELS
CORRESPONDING TO CODES

|  | 511 | 512 | 513 | 514 | 515 |
|---|---|---|---|---|---|
| PATTERN 1 | 0 | 0 | 0 | 0 | 0 |
| PATTERN 2 | 0 | 0 | 0 | 0 | 0 |
| PATTERN 3 | 0 | 0 | 0 | 0 | 0 |
| PATTERN 4 | 0 | 0 | 0 | 0 | 1 |
| PATTERN 5 | 0 | 1 | 1 | 1 | 1 |
| PATTERN 6 | 1 | 1 | 1 | 1 | 1 |
| PATTERN 7 | 1 | 1 | 0 | 0 | 0 |
| PATTERN 8 | 0 | 0 | 0 | 0 | 0 |
| PATTERN 9 | 1 | 1 | 1 | 1 | 1 |
| PATTERN 10 | 1 | 1 | 1 | 0 | 0 |

MMSW

FIG. 10

CORRESPONDING PIXELS

| | 511 | 512 | 68 | 498 | 514 | 513 | 515 |
|---|---|---|---|---|---|---|---|
| PATTERN 1 | 0 | 0 | 0 | 0 | 0 | 0 | 0 |
| PATTERN 2 | 0 | 0 | 0 | 1 | 0 | 0 | 0 |
| PATTERN 3 | 0 | 0 | 0 | 0 | 0 | 0 | 0 |
| PATTERN 4 | 0 | 0 | 0 | 0 | 0 | 0 | 1 |
| PATTERN 5 | 0 | 1 | 0 | 1 | 1 | 1 | 1 |
| PATTERN 6 | 1 | 1 | 1 | 1 | 1 | 1 | 1 |
| PATTERN 7 | 1 | 1 | 0 | 0 | 0 | 0 | 0 |
| PATTERN 8 | 0 | 0 | 0 | 0 | 0 | 0 | 0 |
| PATTERN 9 | 1 | 1 | 1 | 1 | 1 | 1 | 1 |
| PATTERN 10 | 1 | 1 | 1 | 1 | 0 | 1 | 0 |

RESULT OF BINARIZATION

FIG. 11

CORRESPONDING PIXELS

|  | 511 | 512 | 68 | 498 | 514 | 513 | 515 |
|---|---|---|---|---|---|---|---|
| PATTERN 1 | 0 | 0 | 0 | 0 | 0 | 0 | 0 |
| PATTERN 2 | 0 | 0 | 0 | 1 | 0 | 0 | 0 |
| PATTERN 3 | 0 | 0 | 0 | 0 | 0 | 0 | 0 |
| PATTERN 4 | 0 | 0 | 0 | 0 | 0 | 0 | 1 |
| PATTERN 5 | 0 | 1 | 0 | 1 | 1 | 1 | 1 |
| PATTERN 6 | 1 | 1 | 1 | 1 | 1 | 1 | 1 |
| PATTERN 7 | 1 | 1 | 0 | 0 | 0 | 0 | 0 |
| PATTERN 8 | 0 | 0 | 0 | 0 | 0 | 0 | 0 |
| PATTERN 9 | 1 | 1 | 1 | 1 | 1 | 1 | 1 |
| PATTERN 10 | 1 | 1 | 1 | 1 | 0 | 1 | 0 |

6001
6003
6002

RESULT OF ERROR DETECTION
AND EDGE POSITION DETECTION

FIG. 13

| | 511 | 512 | 513 | 513 | 514 | 514 | 515 |
|---|---|---|---|---|---|---|---|
| PATTERN 1 | 0 | 0 | 0 | 0 | 0 | 0 | 0 |
| PATTERN 2 | 0 | 0 | 0 | 0 | 0 | 0 | 0 |
| PATTERN 3 | 0 | 0 | 0 | 0 | 0 | 0 | 0 |
| PATTERN 4 | 0 | 0 | 0 | 0 | 0 | 0 | 1 |
| PATTERN 5 | 0 | 1 | 1 | 1 | 1 | 1 | 1 |
| PATTERN 6 | 1 | 1 | 1 | 1 | 1 | 1 | 1 |
| PATTERN 7 | 1 | 1 | 0 | 0 | 0 | 0 | 0 |
| PATTERN 8 | 0 | 0 | 0 | 0 | 0 | 0 | 0 |
| PATTERN 9 | 1 | 1 | 1 | 1 | 1 | 1 | 1 |
| PATTERN 10 | 1 | 1 | 1 | 1 | 0 | 0 | 0 |

RESULT OF CONSTRAINT OF PATTERNS

INFORMATION PROCESSING APPARATUS, INFORMATION PROCESSING METHOD, AND STORAGE MEDIUM

BACKGROUND OF THE INVENTION

Field of the Invention

Aspects of the present disclosure generally relate to information processing and, more particularly, to an information processing apparatus, an information processing method, a storage medium, and a technique for obtaining a correspondence relationship between a camera and a projector.

Description of the Related Art

There is widely known a three-dimensional measurement apparatus that obtains the three-dimensional coordinates of a measurement target object according the principle of triangulation by projecting pattern light from a projector onto the measurement target object and causing an imaging apparatus to observe light reflected from the measurement target object so as to find a correspondence between projection coordinates and image coordinates. According to the three-dimensional measurement method of projecting pattern light and observing reflected light, in a case where the measurement target object is a black object or metal object with low diffuse reflectance, since the reflected light is weak, the observed luminance of the pattern light may decrease. Therefore, the three-dimensional measurement method is greatly affected by noise, such as shot noise, so that the correspondence between projection coordinates and image coordinates cannot be precisely obtained. Thus, the three-dimensional measurement accuracy may be reduced.

As one of methods for coping with this issue, Japanese Patent Application Laid-Open No. 2014-115264 discusses a method of reducing the influence of noise by lengthening the exposure time of a specific pattern to increase the observed luminance. Besides, Gupta, Mohit; Yin, Qi; Nayar, Shree K, Structured Light in Sunlight, ICCV, 2013 discusses a method of obtaining the observed luminance required for high-accuracy measurement by narrowing the spreading of light emitted by a projector to increase the intensity of illumination of pattern light. Furthermore, Gupta, Mohit; Agrawal, Amit; Veeraraghavan, Ashok; Narasimhan, Srinivasa G, Structured Light 3D Scanning in the Presence of Global Illumination, CVPR, 2011 discusses a method of performing high-precision three-dimensional measurement by improving contrast using a projection pattern composed only of a striped pattern with a predetermined width or more without involving a thin striped pattern, which is likely to lead to low contrast.

However, the method discussed in Japanese Patent Application Laid-Open No. 2014-115264 disadvantageously requires a long measurement time since the exposure time is lengthened. Furthermore, the method discussed in Gupta, Mohit; Yin, Qi; Nayar, Shree K, Structured Light in Sunlight, ICCV, 2013 disadvantageously narrows a measurement range since the range onto which a pattern light is projected is narrowed.

SUMMARY OF THE INVENTION

According to an aspect of the present disclosure, an information processing apparatus includes an image acquisition unit configured to acquire an image obtained by imaging a target object onto which a pattern having a bright portion and a dark portion is projected by a projection unit, an allocation unit configured to allocate, to a pixel in the image, a label corresponding to luminance of the pixel by referring to a characteristic of the pattern, a correspondence relationship derivation unit configured to derive a correspondence relationship between a position of the pattern in a projection plane of the projection unit and a position of the pattern in the acquired image, and a three-dimensional coordinate derivation unit configured to derive three-dimensional coordinates of a surface of the target object based on the derived correspondence relationship.

According to an exemplary embodiment of the present disclosure, even in a case where there is an influence of nose due to the small observed luminance of a target object onto which a pattern is projected, the correspondence between projection coordinates and image coordinates can be obtained.

Further features of the present disclosure will become apparent from the following description of exemplary embodiments with reference to the attached drawings.

BRIEF DESCRIPTION OF THE DRAWINGS

FIG. 8 illustrates a comparison of a part of a pattern with the thinnest stripe width between Gray code and MMSW.

FIG. 9 illustrates patterns of MMSW in consecutive pixels.

FIG. 10 illustrates a result obtained by binarizing a captured image.

FIG. 11 illustrates processing performed by an information processing apparatus according to a second exemplary embodiment.

FIG. 13 illustrates processing performed by the information processing apparatus according to the second exemplary embodiment.

DESCRIPTION OF THE EMBODIMENTS

Hereinafter, information processing apparatuses according to various exemplary embodiments of the present disclosure will be described in detail with reference to the drawings.

Prior to description of the exemplary embodiments of the present disclosure, a hardware configuration of an information processing apparatus according to each exemplary embodiment is described with reference to FIG. 23.

Figure 23:
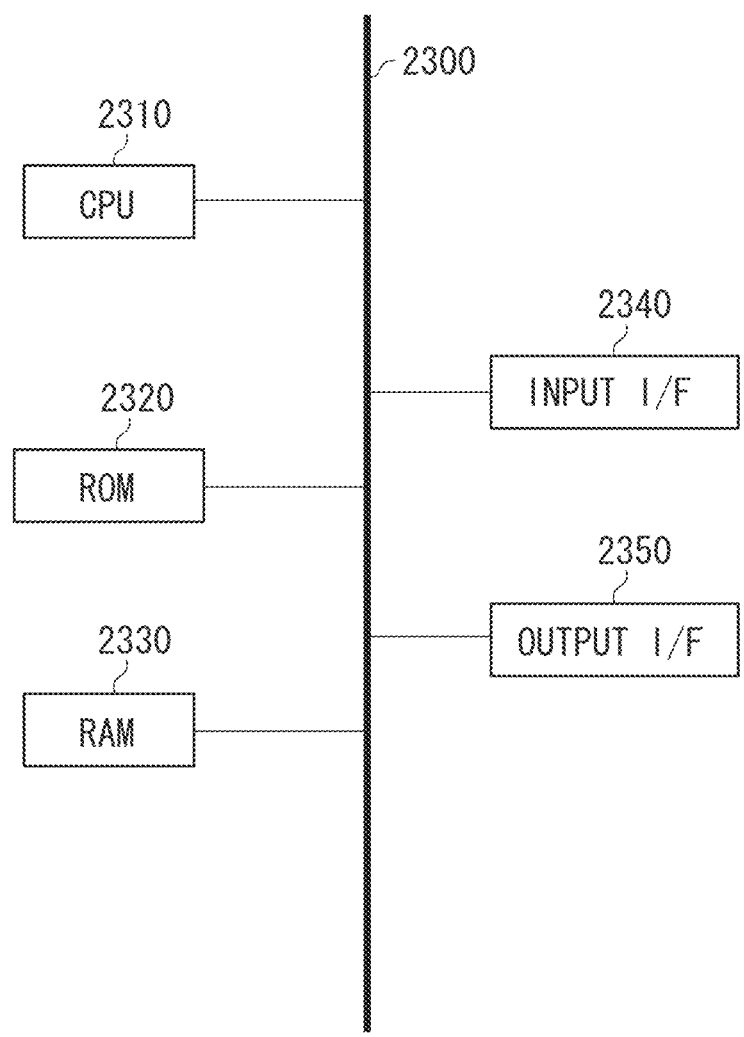
FIG. 23 illustrates an example of a hardware configuration of an information processing apparatus according to an exemplary embodiment of the present disclosure.

FIG. 23 illustrates a hardware configuration of an information processing apparatus according to each exemplary embodiment. Referring to FIG. 23, a central processing unit (CPU) 2310 comprehensively controls each device that is connected thereto via a bus 2300. The CPU 2310, which may include one or more processors, reads and executes processing steps and programs stored in a read-only memory (ROM) 2320. Processing programs, including an operating system (OS), and device drivers according to each exemplary embodiment, which are stored in the ROM 2320, are temporarily stored in a random access memory (RAM) 2330 and are then executed by the CPU 2310 as appropriate. In addition, an input interface (I/F) 2340 receives, from an external device, such as display device or an operation device, an input signal in a format that can be processed by the information processing apparatus. An output I/F 2350 outputs, to an external device, such as a display device, an output signal in a format that can be processed by the display device. The hardware configuration of FIG. 23 may be configured to operate, for example, as an image acquisition unit, an allocation unit, a correspondence relationship derivation unit, a change unit, a three-dimensional coordinate derivation unit, and a detection unit, as in the claims. As used herein, the term "unit" generally refers to any combination of software, firmware, hardware, or other component, such as circuitry, that is used to effectuate a purpose.

An information processing apparatus according to a first exemplary embodiment is configured to be able to calculate high-precision three-dimensional coordinates by correcting and determining errors of discrimination of a measurement target region, which occur under the influence of noise, based on the structural feature of a projected Gray code pattern group.

[Configuration of Apparatus]

Figure 1:
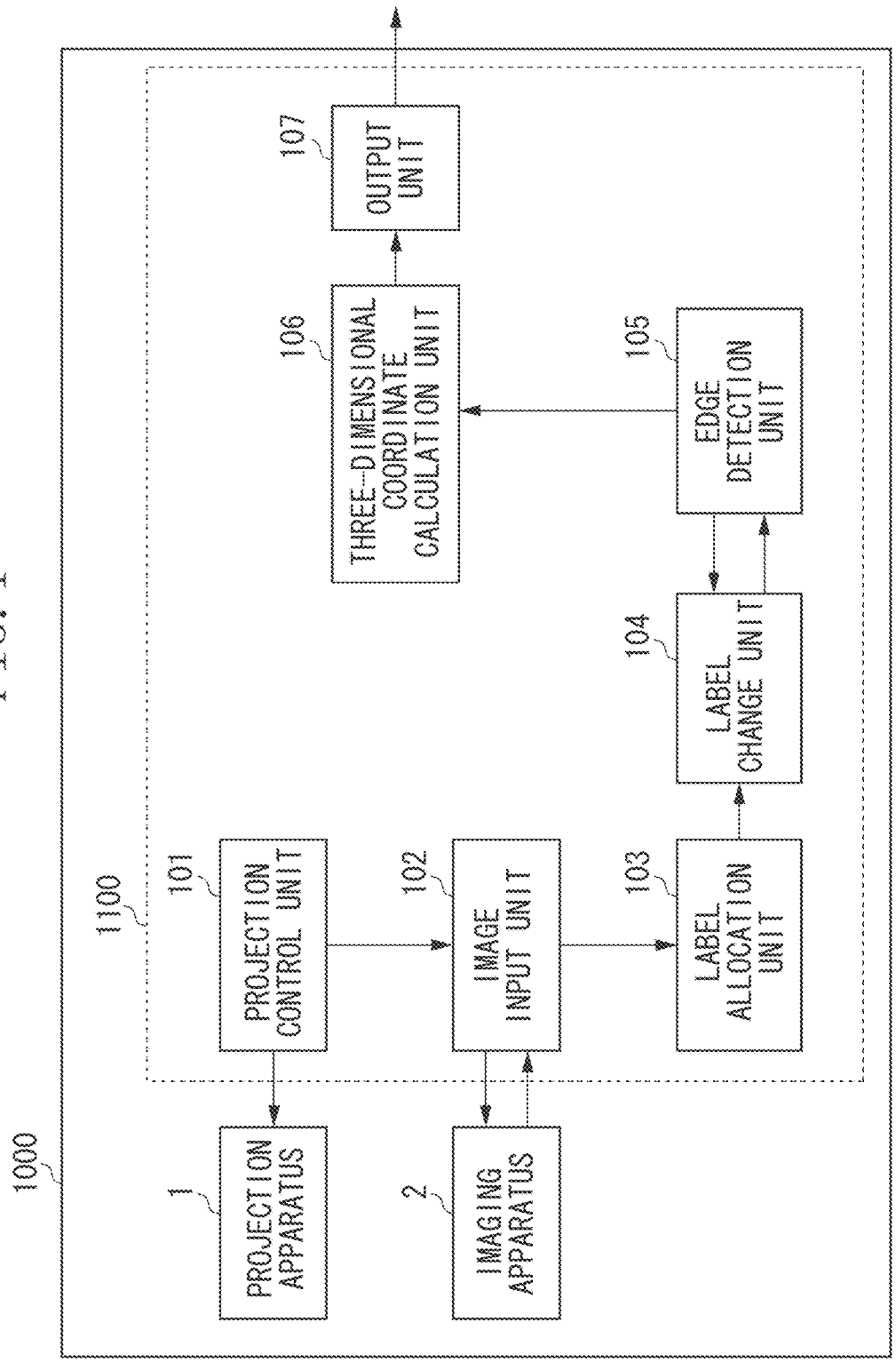
FIG. 1 is a block diagram illustrating a configuration example of an information processing apparatus according to a first exemplary embodiment.

FIG. 1 illustrates in block diagram form a configuration example of a three-dimensional measurement apparatus 1000, which includes an information processing apparatus 1100 according to the first exemplary embodiment. A projection apparatus 1 projects space-division pattern light (a pattern) onto a measurement target object. The pattern is reflected by the surface of the measurement target object and is then captured as an image by an imaging apparatus 2. The image captured by the imaging apparatus 2 is sent to the information processing apparatus 1100, and the three-dimensional coordinates of the measurement target object is calculated by the information processing apparatus 1100. Furthermore, the information processing apparatus 1100 controls operations of the projection apparatus 1 and the imaging apparatus 2.

The information processing apparatus 1100 includes a projection control unit 101, an image input unit 102, a label allocation unit 103, a label change unit 104, an edge detection unit 105, a three-dimensional coordinate calculation unit 106, and an output unit 107.

These units may be constituted by a general-purpose computer (hardware) including a CPU (which may include one or more processors), a memory, a storage device, such as a hard disk, and various input/output interfaces, and may include a network of separate computers or separate computer processors. Each of the projection control unit 101, the image input unit 102, the label allocation unit 103, the label change unit 104, the edge detection unit 105, the three-dimensional coordinate calculation unit 106, and the output unit 107 can be realized when the CPU executes a relevant program.

Figure 2:
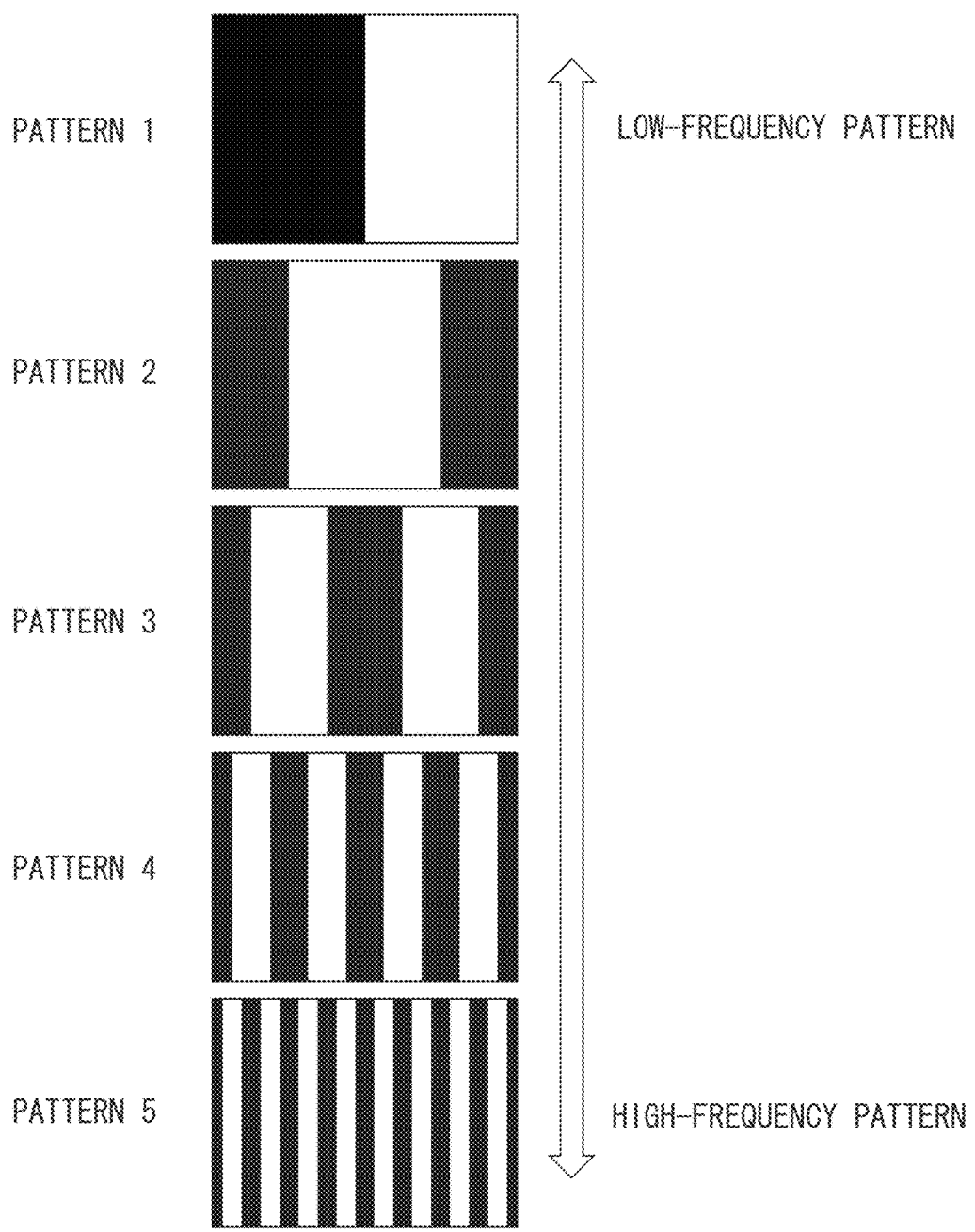
FIG. 2 illustrates patterns of Gray code as examples of space-division patterns.

The projection control unit 101, which stores pattern images of Gray code each including a bright portion or portions and a dark portion and portions, which are illustrated in FIG. 2, controls the projection apparatus 1 to project patterns in order from a low-frequency pattern to a high-frequency pattern of the Gray code patterns and simultaneously outputs a control signal to the image input unit 102. However, the patterns to be projected are not limited to Gray code patterns, but may be a space-division pattern group having the same feature as the feature of the Gray code pattern group, which is described below.

The image input unit 102 may be referred to as an image acquisition unit and controls the imaging apparatus 2 according to timing of the control signal input from the projection control unit 101 to capture an image, and receives a captured image (acquires an image) obtained with the pattern projected onto the measurement target object. Furthermore, the image input unit 102 successively outputs the captured images to the label allocation unit 103. However, the projection of patterns and capturing of images do not need to be performed in this order, and the order may be changed. Alternatively, patterns may be projected divisionally with respective wavelengths of pattern light and imaging apparatuses associated with the respective wavelengths may be used, so that all the patterns may be simultaneously projected to be used for capturing images.

The label allocation unit 103 allocates binary (white and black) labels according to the luminance value of a captured image obtained with projected patterns. The binarization may be performed using a method similar to ordinary space encoding. For example, when the luminance histogram of a captured image is divided with a certain threshold value, the binarization may be performed using such a threshold value as to maximize interclass dispersion. The label allocation unit 103 outputs the obtained result of binarization to the label change unit 104.

The label change unit 104 changes a label so as to correct any label allocation error of the result of binarization input from the label allocation unit 103 using features of the Gray code patterns. The label change unit 104 outputs the obtained result of binarization to the edge detection unit 105.

The edge detection unit 105 detects sub-pixel edges based on the result of binarization input from the label change unit 104. The edge detection unit 105 outputs the detected edge positions with sub-pixel precision to the label change unit 104. Furthermore, when all the patterns have been completely processed, the edge detection unit 105 integrates the result of binarization and the sub-pixel edge information for each pattern, performs spatial encoding, and obtains a correspondence relationship (derives a correspondence relationship) between projection coordinates and image coordinates. The edge detection unit 105 then outputs the obtained correspondence relationship between projection coordinates and image coordinates to the three-dimensional coordinate calculation unit 106.

The three-dimensional coordinate calculation unit 106 derives three-dimensional measurement points corresponding to the sub-pixel edges using the correspondence relationship between projection coordinates (coordinates on the projection plane, i.e., the image coordinates of a projector) and image coordinates input from the edge detection unit 105 (derives three-dimensional coordinates). Thus, the three-dimensional coordinate calculation unit 106 calculates (derives) three-dimensional coordinates based on the correspondence relationship between projection coordinates and image coordinates and the previously-obtained calibration data about the projection apparatus 1 and the imaging apparatus 2.

The output unit 107 outputs the obtained three-dimensional coordinates to a monitor, another computer, a server apparatus, an auxiliary storage device, or any type of recording medium.

These functional units described above are implemented by the CPU 2310 loading programs stored in the ROM 2320 onto the RAM 2330 and executing processing according to the flowcharts, which are described below. Furthermore, for example, in a case where software processing performed by the CPU 2310 is replaced with a hardware configuration, computation units and circuits may be arranged which correspond to the respective functional units described in the present exemplary embodiment.

[Measurement Processing]

Figure 6:
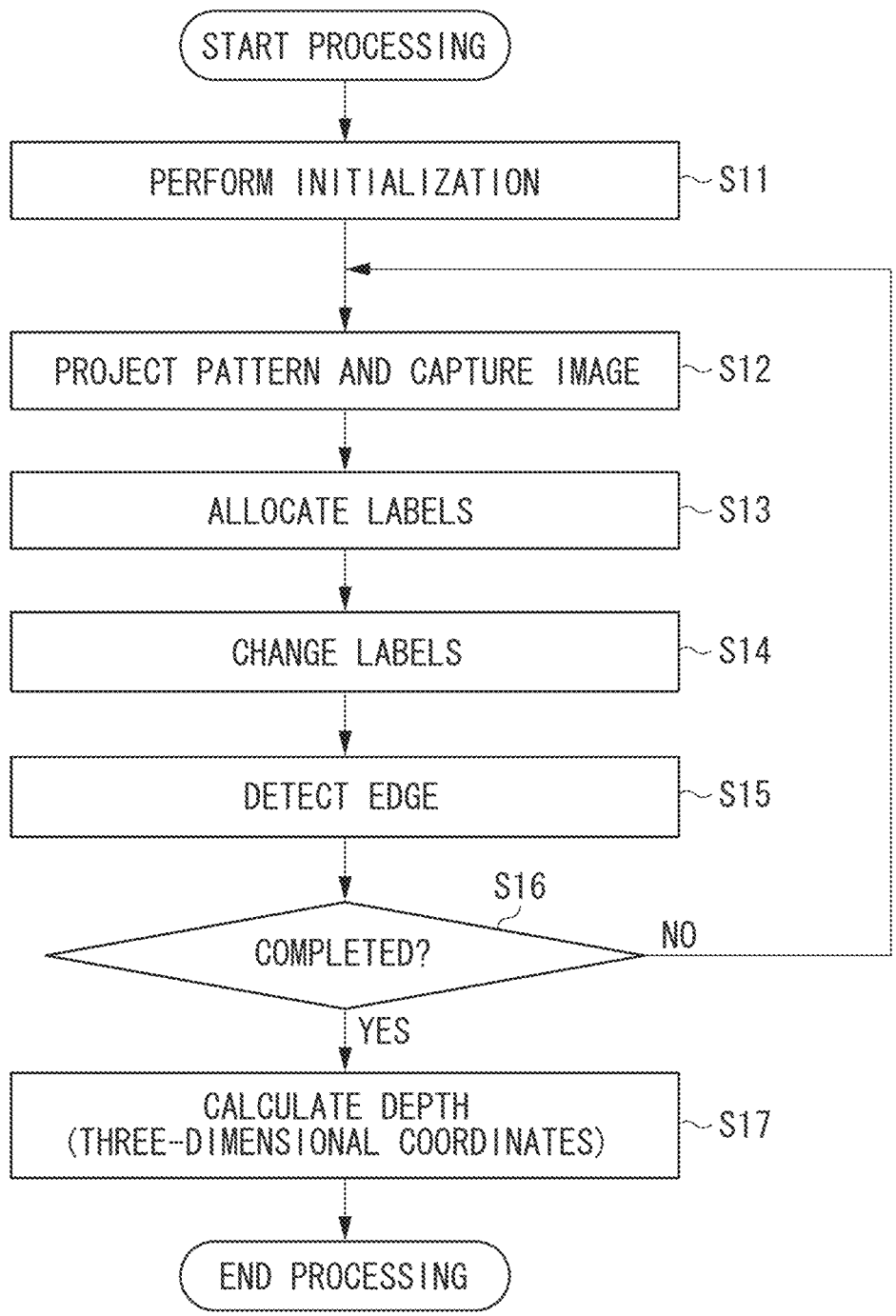
FIG. 6 is a flowchart illustrating measurement processing performed by the information processing apparatus according to the first exemplary embodiment.

Measurement processing performed by the information processing apparatus 1100 according to the first exemplary embodiment is described with reference to the flowchart of FIG. 6.

(Step S11)

In step S11, when the three-dimensional measurement apparatus 1000 is started, the information processing apparatus 1100 performs initialization processing. The initialization processing includes starting the projection apparatus 1 and the imaging apparatus 2 and reading the calibration data about the projection apparatus 1 and the imaging apparatus 2 and the projection patterns.

(Step S12)

In step S12, the projection control unit 101 causes the projection apparatus 1 to project patterns in order from a low-frequency pattern to a high-frequency pattern of the Gray code patterns and simultaneously sends a control signal to the image input unit 102. The image input unit 102, which has received the control signal, causes the imaging apparatus 2 to capture an image with the projected pattern and then sends the captured image to the label allocation unit 103.

(Step S13)

In step S13, the label allocation unit 103, which has received the captured image, allocates binary labels to the captured image with the projected patterns.

(Step S14)

In step S14, the label change unit 104 changes labels in such a way that the constraint of patterns is maintained using the edge positions detected until then based on the features of Gray code. As illustrated in FIG. 2, since Gray code has the features that the Hamming distance between adjacent codes is "1" (for example, between 00100 and 00110), adjacent projection pixels forming an edge in a pattern (hereinafter referred to as a "pattern edge position") have the same bright or dark portions in the other patterns. Furthermore, in the case of Gray code, one edge is projected for every region that has been discriminated. Therefore, if processing is performed in turn from a low-frequency pattern to a high-frequency pattern, when an edge has been detected, a correspondence relationship between imaging pixels forming the edge (hereinafter referred to an "edge position") and projection coordinates is obtained, so that labels of the edge position in patterns subsequent to the present pattern can be determined.

Figure 3:
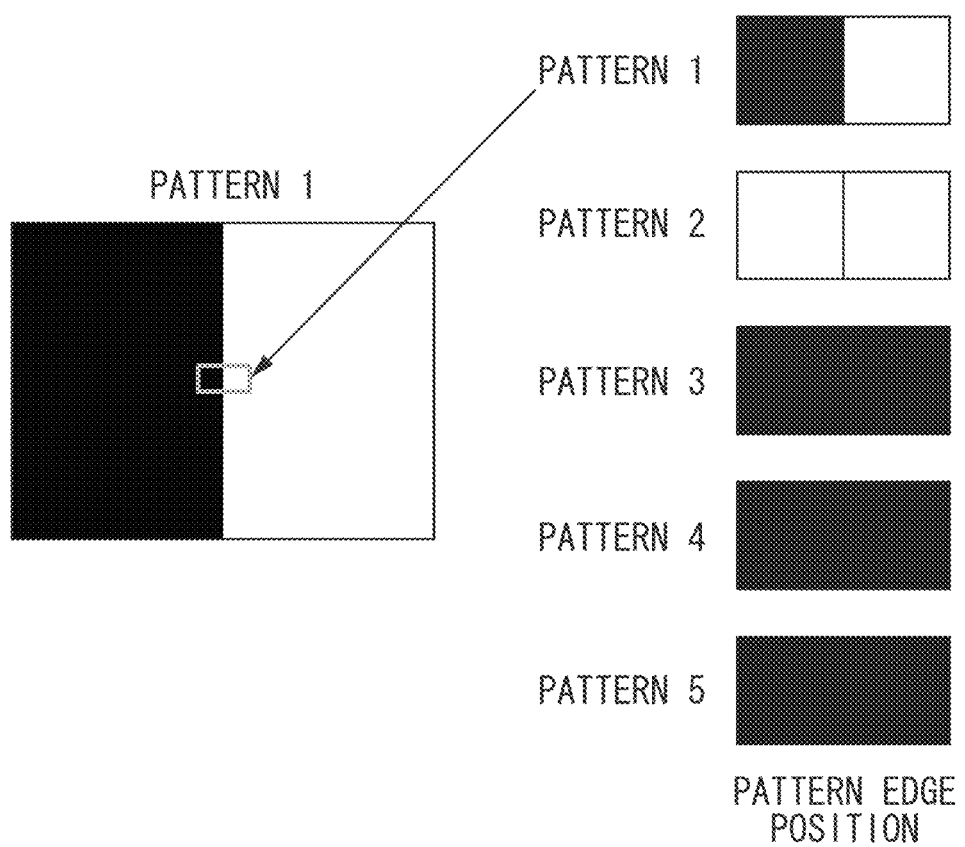
FIG. 3 illustrates a code of the pattern edge position serving as a black and dark boundary in a pattern 1.
Figure 4:
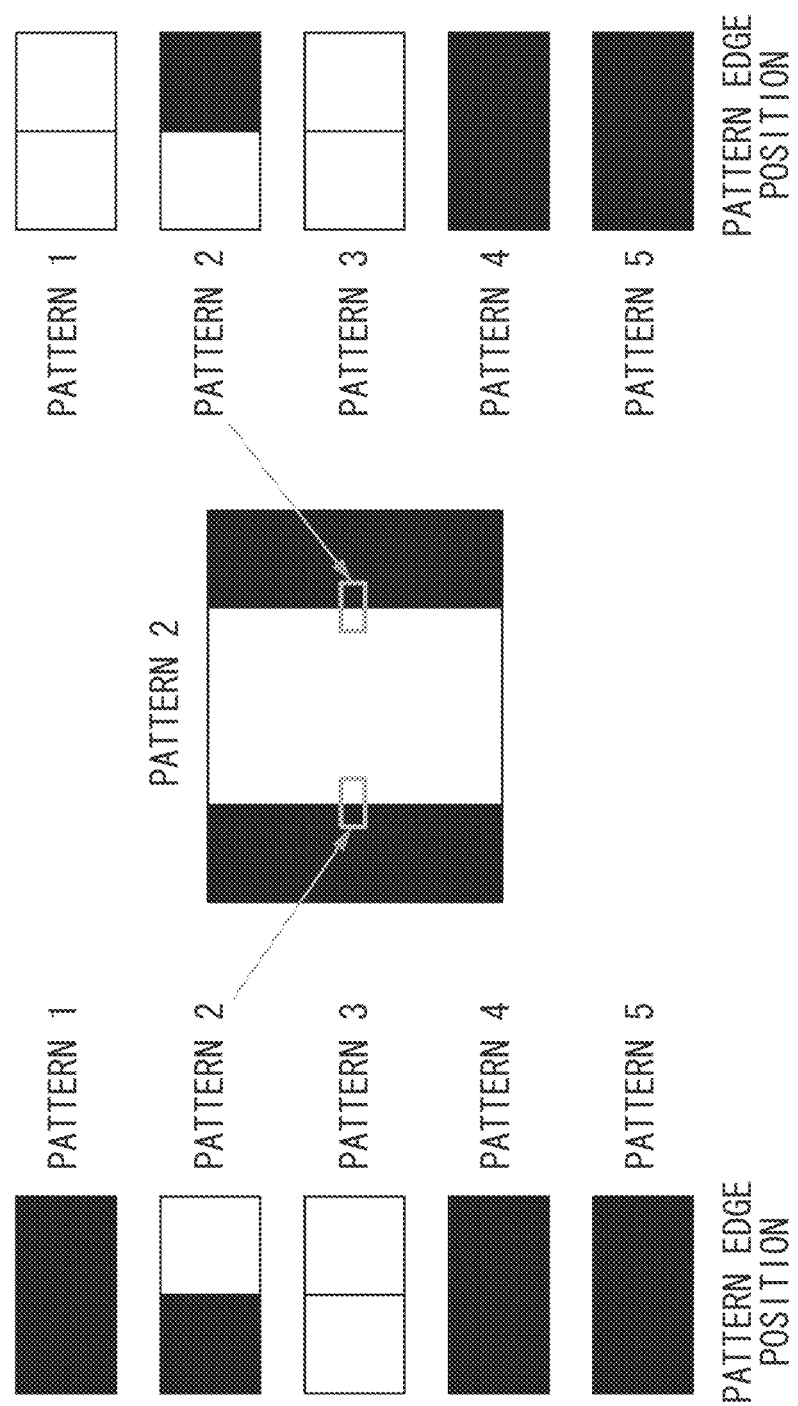
FIG. 4 illustrates a code of the pattern edge position serving as a black and dark boundary in a pattern 2.

For example, the pattern edge position indicated by a frame set in a pattern 1 illustrated in FIG. 3 is determined to have a bright portion and a black portion in the pattern 1, to have bright portions in a pattern 2, and to have dark portions in a pattern 3 and subsequent patterns. Furthermore, the pattern edge position indicated by a frame set in the pattern 2 illustrated in FIG. 4 is determined to have a bright portion and a black portion in the pattern 2, to have bright portions in the pattern 3, and to have dark portions in a pattern 4 and subsequent patterns. In this way, codes are determined in such a manner that, when the pattern edge position in Gray code has a bright portion and a dark portion in a pattern, that pattern edge position has bright portions in the next pattern and has dark portions in the subsequent patterns. Therefore, with the use of (by referring to) such features, when a higher-frequency pattern is decoded, a change of labels is performed with the label previously determined in the edge position detected in the preceding lower-frequency pattern. Since it is considered that because the lower-frequency pattern, the thicker the stripe of a bright or dark portion is, a higher contrast can be obtained and labels can be easily allocated, the edge position can also be said to be probable. Accordingly, processing patterns in order from a lower-frequency pattern enables preferentially allocating a more probable label. The edge position is acquired by the edge detection unit 105, which is described below. In this way, a more probable result of binarization can be obtained with the constraint of patterns (characteristic of time series of patterns) maintained.

(Step S15)

Figure 5:
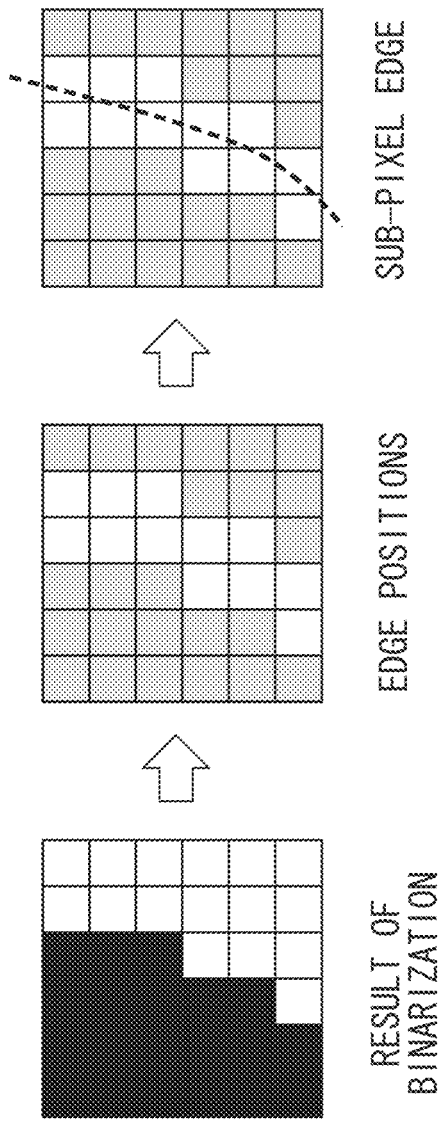
FIG. 5 illustrates processing performed by an edge detection unit according to the first exemplary embodiment.

In step S15, the edge detection unit 105 detects an edge position and a sub-pixel edge based on the result of binarization. FIG. 5 illustrates processing performed by the edge detection unit 105. First, the edge detection unit 105 scans the result of binarization in the horizontal direction of the image (or the vertical direction of the image if the edge extends in the horizontal direction) to extract adjacent pixels at the boundary where a white label and a black label counterchange, and sets the extracted adjacent pixels as an edge position. Then, the edge detection unit 105 obtains a sub-pixel edge in which the edge positions are smoothly joined, by performing, for example, function fitting. Furthermore, the edge position does not need to be limited to adjacent pixels, but may be a plurality of pixels extending a predetermined width. Moreover, the method of obtaining a sub-pixel edge does not need to be limited to function fitting. For example, bright/dark reversal patterns may also be projected for imaging in addition to normal patterns illustrated in FIG. 2, and intersection points obtained by plotting observed luminance values of the normal patterns and the reversal patterns may be set as a sub-pixel edge. The edge detection unit 105 stores the thus-obtained result of binarization of patterns and the sub-pixel edge, and outputs the edge position to the label change unit 104.
(Step S16)

In step S16, the edge detection unit 105 determines whether the projection, imaging, and processing have been completed for all the pattern images. If it is determined that those have been completed (YES in step S16), the processing proceeds to step S17. If it is determined that those have not yet been completed (NO in step S16), the processing returns to step S12.
(Step S17)

In step S17, the three-dimensional coordinate calculation unit 106 calculates three-dimensional coordinates from a correspondence relationship between projection coordinates and image coordinates, and sends the calculated three-dimensional coordinates to the output unit 107. Then, the output unit 107 outputs data of the three-dimensional coordinates, and the processing ends.

In addition, processing in step S12 does not need to be included in the repetition. After, in step S12, the projection and imaging have been completed for all the patterns, processing from step S13 to step S15 may be repeated or may be performed in parallel. Moreover, processing in step S13 and step S14 does not need to be performed in the order illustrated in FIG. 6, but may be performed in the order changed as appropriate.

With the above-described configuration, code errors of spatial codes are corrected with the use of geometric features of projection patterns, so that the influence of noise occurring in a captured image can be reduced and the three-dimensional coordinates can be calculated with high precision.

In a second exemplary embodiment, to perform spatial encoding, Maximum Min-Stripe-Width (MMSW) patterns, which are more adapted to measure a low-reflective object than Gray code patterns, are projected. Furthermore, to calculate high-precision three-dimensional coordinates, discrimination errors of measurement target regions occurring under the influence of noise are corrected and determined based on features of the MMSW patterns.

[Configuration of Apparatus]

An information processing apparatus 2100 according to the second exemplary embodiment is described below.

The information processing apparatus 2100 includes a projection control unit 201, an image input unit 202, a label allocation unit 203, a label change unit 204, an edge detection unit 205, a three-dimensional coordinate calculation unit 206, and an output unit 207. The block diagram according to the second exemplary embodiment is the same as that of the first exemplary embodiment (FIG. 1) and is, therefore, omitted from the drawings. In FIG. 1, reference numerals "1100", "101", "102", "103", "104", "105", "106", and "107" in the first exemplary embodiment are replaced by reference numerals "2100", "201", "202", "203", "204", "205", "206", and "207", respectively, in the second exemplary embodiment.

Figure 7:
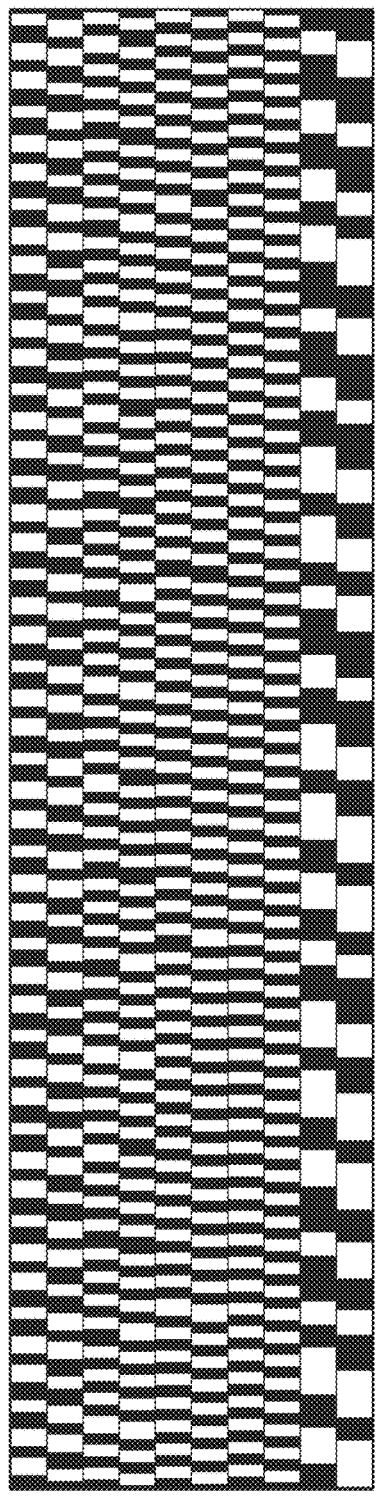
FIG. 7 illustrates patterns of Maximum Min-Stripe-Width (MMSW) as examples of space-division patterns.

The projection control unit 201 stores images of the MMSW patterns illustrated in FIG. 7, which are used for discussion in Gupta, Mohit; Agrawal, Amit; Veeraraghavan, Ashok; Narasimhan, Srinivasa G, Structured Light 3D Scanning in the Presence of Global Illumination, CVPR, 2011. The MMSW pattern is a pattern designed in such a manner that the narrowest stripe in width becomes as thick as possible. Accordingly, since, as illustrated in FIG. 8, MMSW exhibits codes composed of stripes in which the width of the narrowest stripe is greater than that of Gray code, the MMSW pattern has the features of being high in contrast under the most adverse condition and being unlikely to be affected by noise, thus being more adapted to measure a low-reflective object. The projection control unit 201 controls the projection apparatus 1 to project MMSW patterns and simultaneously sends a control signal to the image input unit 202. However, the patterns to be projected do not need to be limited to the MMSW patterns, but may be a group of space-division patterns that has the features of a group of MMSW patterns, which is described below with reference to the description of the label change unit 204. Furthermore, the projection of patterns and capturing of images are performed in no particular order. Alternatively, patterns may be projected divisionally with respective wavelengths of pattern light and imaging apparatuses associated with the respective wavelengths may be used, so that all the patterns may be simultaneously projected to be used for capturing images.

The label change unit 204 corrects any label allocation error of the result of binarization input from the label allocation unit 203 using the features of the MMSW patterns. MMSW has the same feature, in which the Hamming distance at the pattern edge position is "1", as Gray code. Therefore, if labels are changed in such a manner that the Hamming distance at the edge position becomes "1" after binarization is completed for all the patterns, a result of binarization in which the constraint of patterns is maintained can be obtained. The label change unit 204 outputs the obtained result of binarization to the edge detection unit 205.

The other operations of the information processing apparatus 2100 are the same as those in the first exemplary embodiment, and are, therefore, omitted from description.

[Measurement Processing]

Figure 14:
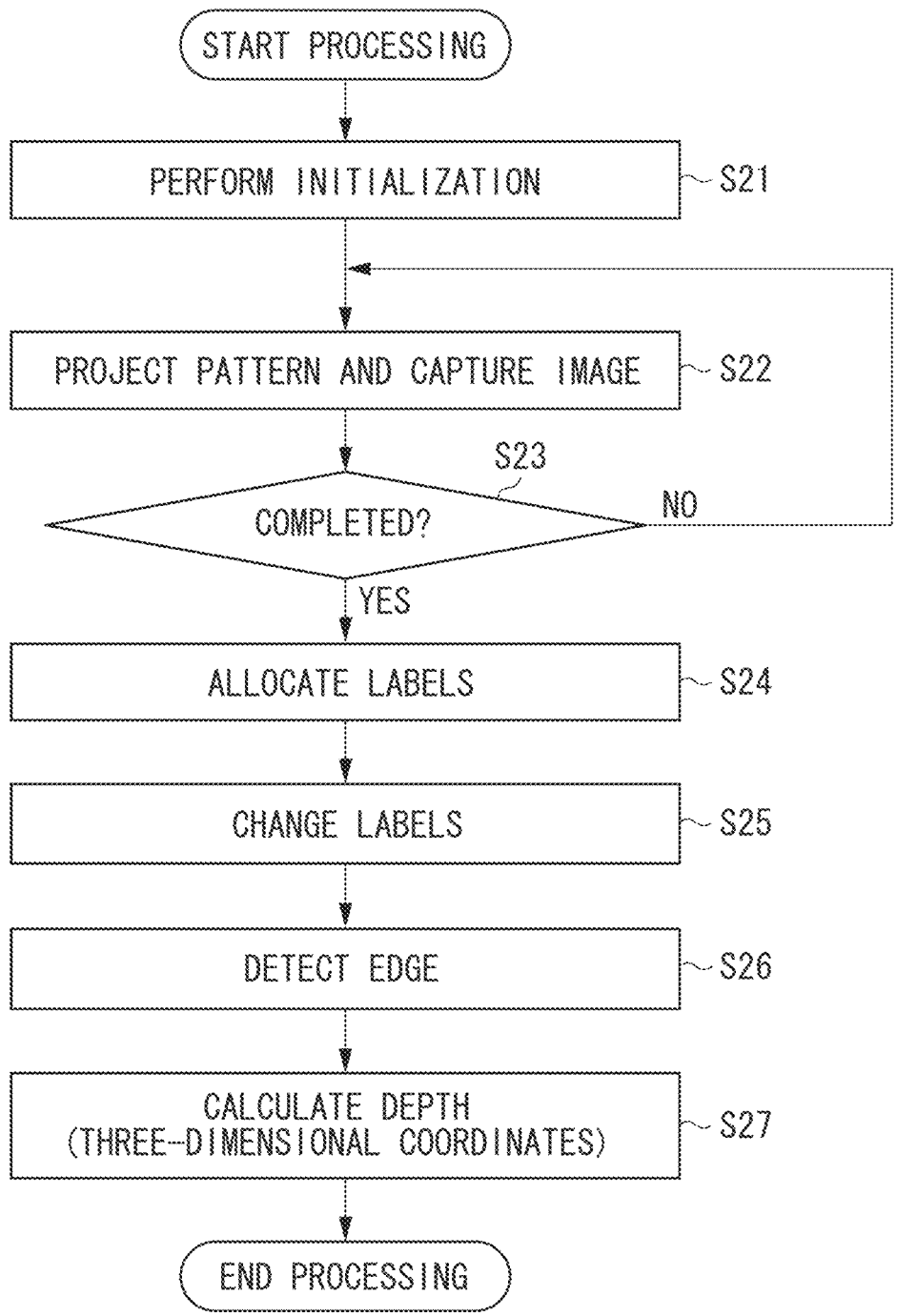
FIG. 14 is a flowchart illustrating measurement processing performed by a three-dimensional measurement apparatus according to the second exemplary embodiment.

Measurement processing performed by the information processing apparatus 2100 according to the second exemplary embodiment is described with reference to the flowchart of FIG. 14.

(Step S22)

In step S22, after initialization in step S21, the projection control unit 201 causes the projection apparatus 1 to project MMSW pattern light and simultaneously sends a control signal to the image input unit 202. The image input unit 202, which has received the control signal, causes the imaging apparatus 2 to capture an image with the projected pattern. Step S22 is repeated until it is determined in step S23 that the projection and imaging have been completed for all the pattern images. After the projection and imaging have been completed for all the pattern images, the image input unit 202 sends the captured images to the label allocation unit 203.

(Step S24)

In step S24, the label allocation unit 203, which has received the captured images, allocates binary labels to the captured images with the projected patterns.

(Step S25)

In step S25, the label change unit 204 changes the labels in such a manner that the constraint of patterns is maintained, based on the features of MMSW.

In the present exemplary embodiment, the label change unit 204 corrects label allocation errors of the result of binarization input from the label allocation unit 203 using the feature of the MMSW pattern. The MMSW pattern has the same feature, in which the Hamming distance at the pattern edge position is "1", as Gray code. Therefore, if labels are changed in such a manner that the Hamming distance at the edge position becomes "1" after binarization is completed for all the patterns, a result of binarization in which the constraint of patterns is maintained can be obtained.

The method of correcting label allocation errors using the feature of the MMSW pattern is described in detail. Here, the flow of processing is described taking as an example the 511th pixel to the 515th pixel, which are consecutive in the horizontal direction in the MMSW pattern illustrated in FIG. 7. FIG. 9 illustrates projection patterns of MMSW in the consecutive 511th pixel to 515 pixel. As illustrated in FIG. 9, since the Hamming distance at the pattern edge position in MMSW is "1", a bright portion and a dark portion counterchange at only portions surrounded by each frame. Corresponding codes are previously assigned to the respective projection pixels. For example, the code corresponding to the 513th pixel is "0000110011". In this way, in MMSW, a projection pixel is made to correspond to a code with the use of a correspondence table. Hereinafter, a projection pixel corresponding to a certain code is referred to as a "corresponding pixel". FIG. 10 illustrates a result obtained by binarizing a captured image for each pattern. However, in the example illustrated in FIG. 10, it is supposed that a part of the result includes an error of binarization.

First, the label change unit 204 detects an error candidate, which has the possibility of being an error. In MMSW, since each pattern is composed of thick stripes, it is considered that locally different labels are seldom allocated. Therefore, since a central pixel of three pixels labels of which change as white—black—white (1-0-1) or black—white—black (0-1-0) on a pixel-by-pixel basis in each pattern, such as each pixel indicated with a gray box illustrated in FIG. 11, is highly likely to have an erroneous label, the label change unit 204 sets the central pixel as an error candidate. Furthermore, the label change unit 204 extracts two adjacent pixels that do not include any error candidate and labels of which differ in white label and black label, as indicated with a gray frame illustrated in FIG. 11, and sets the extracted pixels as an edge position.

Figure 12:
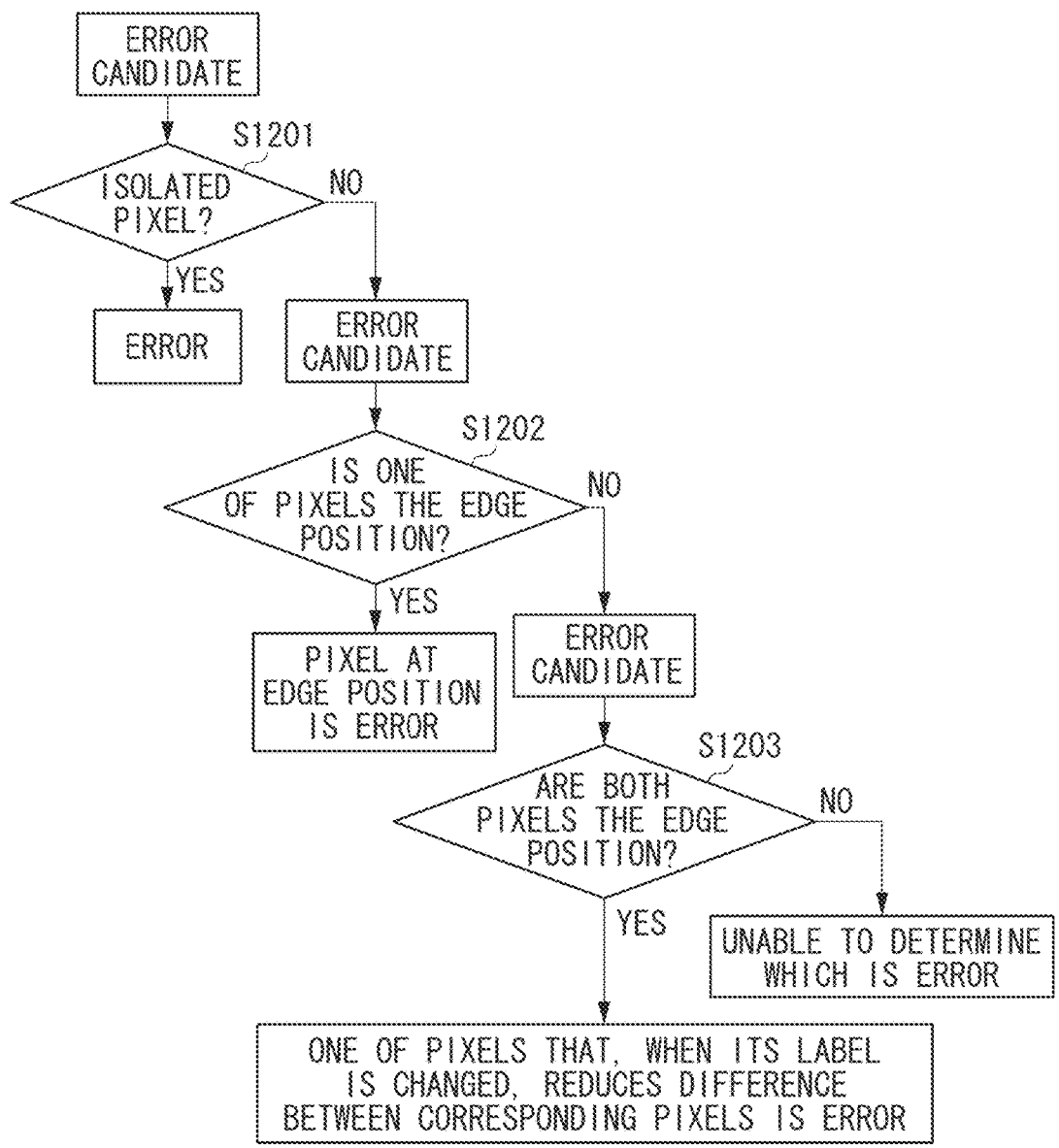
FIG. 12 is a flowchart illustrating processing performed by the information processing apparatus according to the second exemplary embodiment.

Next, the method of determining whether the label of an error candidate is erroneous based on a classification method illustrated in FIG. 12 and changing the label as necessary is described.

(Step S1201)

First, the label change unit 204 regards, as an error, an error candidate pixel that is isolated as a region 6001 illustrated in FIG. 11, and changes the label of the pixel from a white label to a black label or from a black label to a white label.

(Step S1202)

Next, processing of error candidate pixels that are consecutive as a region 6002 or 6003 illustrated in FIG. 11 is described. In step S1202, the label change unit 204 determines whether one of the error candidate pixels is the edge position as in the region 6002. If it is determined that one of the error candidate pixels is the edge position (YES in step S1202), the label change unit 204 changes a white label of the pixel at the edge position, i.e., the right pixel in the region 6002, to a black label in such a manner that the Hamming distance between the pixel at the edge position and the other pixel in the region 6002 becomes "1". This reason is as follows. Considering that portions corresponding to the pattern edge position are projected onto a continuous surface and, since the right pixel in the region 6002 is erroneous, the Hamming distance is obtained as "2" is more probable than considering that a measurement target object surface corresponding to the two pixels is such a discontinuous surface that the Hamming distance is "2".

(Step S1203)

Next, in step S1203, the label change unit 204 determines whether both pixels are the edge position with respect to the pixels in which it is not determined that one of the error candidate pixels is the edge position. If it is determined that both the consecutive error candidate pixels are the edge position as in the region 6003, the label change unit 204 changes a label in such a manner that the Hamming distance becomes "1" and the difference between corresponding pixels becomes smaller. This reason is as follows. It is considered that it does not happen that the corresponding pixels frequently change in a plurality of consecutive imaging pixels, unless the measurement target object surface is of a sharp uneven shape. In the example illustrated in FIG. 11, the corresponding pixel of the right pixel in the region 6003 is "68" and the corresponding pixel of the left pixel in the region 6003 is "512". If the black label of the right pixel is changed to a white label, the Hamming distance becomes "1" and the corresponding pixel thereof becomes "513", so that the difference between corresponding pixels becomes "1". On the other hand, if the white label of the left pixel is changed to a black label, although the Hamming distance remains "1", the corresponding pixel thereof becomes "511", so that the difference between corresponding pixels may becomes "443". Therefore, since changing the label of the right pixel is available to more reduce the difference between corresponding pixels in the adjacent imaging pixels, the label change unit 204 can regard the right pixel as an error and change the label of the right pixel. Furthermore, in a case where the consecutive error candidate pixels are not the edge position, since the label change unit 204 is unable to determine which is an error, the label change unit 204 can change the labels of both the pixels or change the label of one of the pixels.

In this way, using the feature of a group of MMSW patterns enables obtaining a more probable result of binarization with the constraint of the pattern group maintained, such as that illustrated in FIG. 13. In addition, the detection of an error candidate does not need to be performed for every pixel, but may be performed for every two or more pixels. Moreover, the edge position does not need to be limited to adjacent pixels, but may be extended to a certain width of pixels. The label change unit 204 outputs the obtained result of binarization to the edge detection unit 205.

(Step S26)

In step S26, the edge detection unit 205 detects a sub-pixel edge based on the result of binarization and obtains a correspondence relationship between projection coordinates and image coordinates using spatial encoding.

(Step S27)

In step S27, the three-dimensional coordinate calculation unit 206 calculates three-dimensional coordinates based on the correspondence relationship between projection coordinates and image coordinates, and sends the calculated three-dimensional coordinates to the output unit 207. Then, the output unit 107 outputs data of the three-dimensional coordinates, and the processing ends.

In this way, using the feature of a group of MMSW patterns with the use of MMSW composed of thick stripes as space-division patterns enables reducing the influence of noise occurring in a captured image and calculating three-dimensional coordinates with high precision.

A third exemplary embodiment is directed to a three-dimensional measurement apparatus using pattern projection, which, when allocating binarized labels indicating the presence or absence of projection using, for example, MMSW patterns, temporarily allocates a label indicating ambiguity to an ambiguous region and then fixes the allocated binarized label based on spatial neighborhood information (distribution) during processing in a subsequent stage. By doing this, the three-dimensional measurement apparatus can prevent a discrimination error in a measurement target region from occurring under the influence of noise and can calculate high-precision three-dimensional coordinates.

[Configuration of Apparatus]

Figure 15:
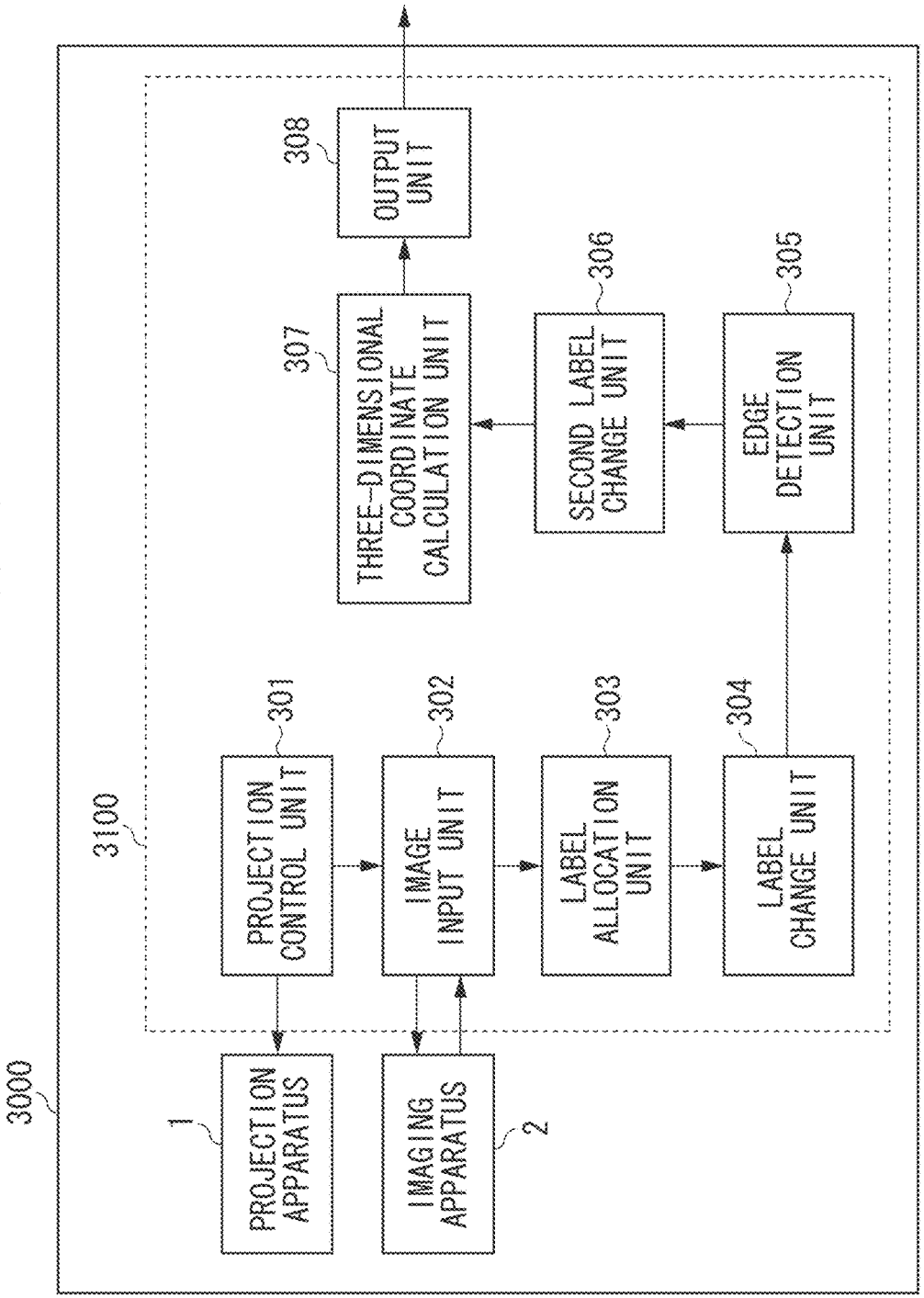
FIG. 15 is a block diagram illustrating a configuration example of a three-dimensional measurement apparatus according to a third exemplary embodiment.

FIG. 15 is a block diagram illustrating an information processing apparatus 3100 according to the third exemplary embodiment. The information processing apparatus 3100 according to the third exemplary embodiment includes a projection control unit 301, an image input unit 302, a label allocation unit 303, a label change unit 304, an edge detection unit 305, a second label change unit 306, a three-dimensional coordinate calculation unit 307, and an output unit 308. The configuration of the third exemplary embodiment is the one obtained by modifying a part of the configuration illustrated in FIG. 1. Here, only portions different from those in the first exemplary embodiment are mainly described.

The projection control unit 301 stores pattern images of MMSW as in the second exemplary embodiment and performs similar processing to that in the second exemplary embodiment. Therefore, the description of the projection control unit 301 is omitted. Although the projection patterns do not need to be limited to MMSW patterns, patterns enabling obtaining high contrast are desirable.

The label allocation unit 303 allocates three-valued (white, gray, and black) labels according to luminance values of a captured image with the projected pattern. The label allocation unit 303 outputs a result of three-valued allocation to the label change unit 304.

The label change unit 304 optimizes the result of three-valued allocation, which has been input from the label allocation unit 303, as initial values and determines the labels with the use of information that labels are likely to be the same in a spatial neighborhood in the captured image. The label change unit 304 outputs the optimized result of three-valued allocation to the edge detection unit 305.

The edge detection unit 305 detects a sub-pixel edge (boundary position) based on the optimized result of three-valued allocation input from the label change unit 304. The details of such processing are described below. The edge detection unit 305 outputs the obtained sub-pixel edge to the second label change unit 306.

The second label change unit 306 determines whether to set an ambiguous region (gray label) to a white label or black label according to the sub-pixel edge input from the edge detection unit 305, thus performing spatial encoding. The details of such processing are described below.

The other configurations are similar to those of the first exemplary embodiment, and are, therefore, omitted from description.

[Measurement Processing]

Figure 18:
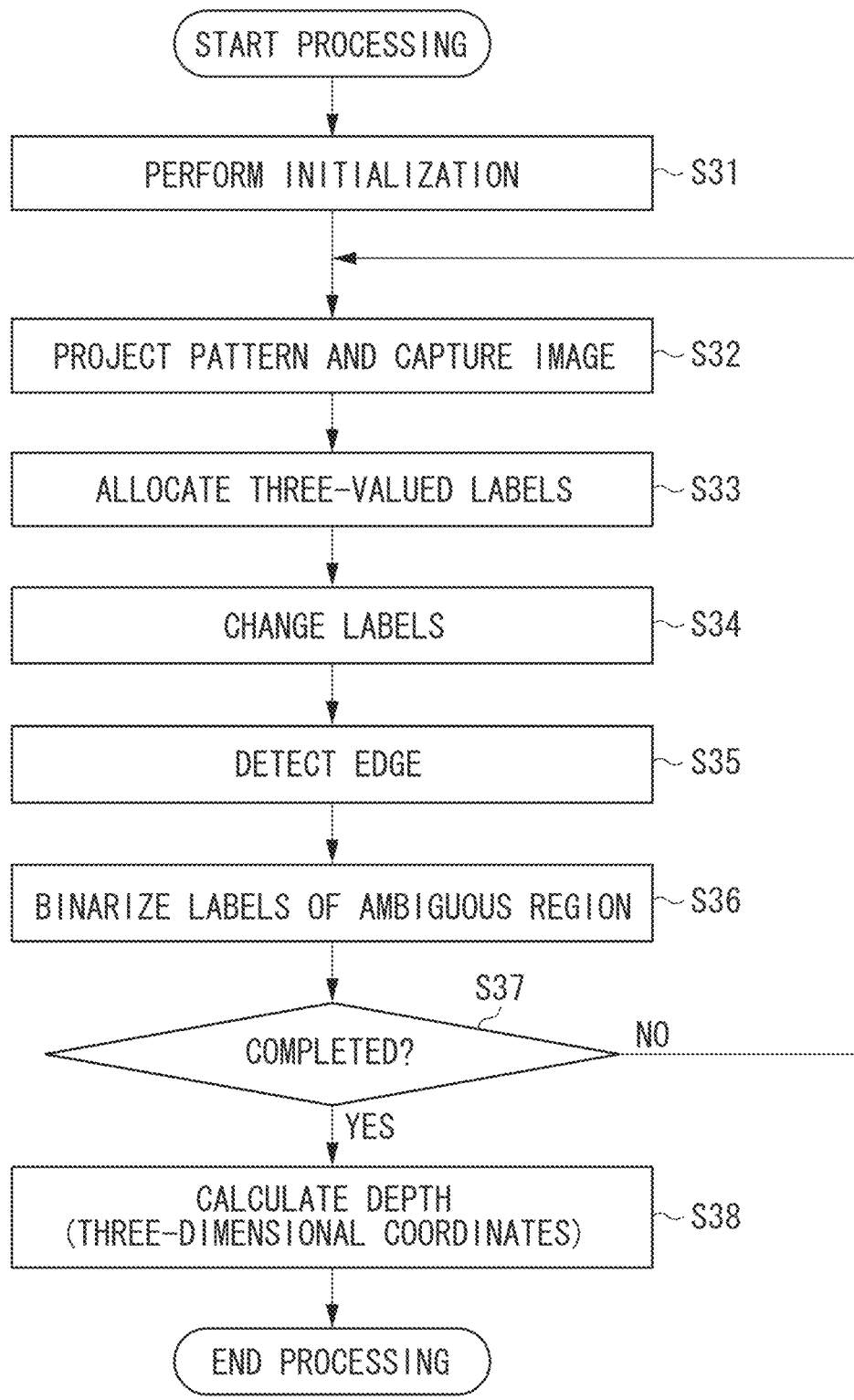
FIG. 18 is a flowchart illustrating processing performed by the information processing apparatus according to the third exemplary embodiment.

Measurement processing performed by the three-dimensional measurement apparatus 3000 according to the third exemplary embodiment is described with reference to the flowchart of FIG. 18.

(Step S31)

In step S31, when the three-dimensional measurement apparatus 3000 is started, the information processing apparatus 3100 performs initialization processing. The initialization processing includes starting the projection apparatus 1 and the imaging apparatus 2 and reading the calibration data about the projection apparatus 1 and the imaging apparatus 2 and the projection patterns.

(Step S32)

In step S32, the projection control unit 301 causes the projection apparatus 1 to project a MMSW pattern and simultaneously sends a control signal to the image input unit 302. The image input unit 302, which has received the control signal, causes the imaging apparatus 2 to capture an image with the projected pattern and then sends the captured image to the label allocation unit 303.

(Step S33)

In step S33, the label allocation unit 303, which has received the captured image, allocates three-valued labels to the captured image with the projected pattern. More specifically, the label allocation unit 303 allocates three-valued (white, gray, and black) labels according to luminance values of the captured image with the projected pattern. In the case of spatial encoding using bright and dark patterns in Gray code or the like, binary (white and black) labels are normally allocated to a captured image to discriminate pixels. However, in the present exemplary embodiment, the label allocation unit 303 does not forcibly binarize portions that are ambiguous and that are unable to be determined and allocates gray labels to those portions, and then binarizes the gray-labeled portions in a subsequent stage. Using the luminance I of a captured image, a threshold value t of luminance for discriminating between white label and black label, and a luminance range w of gray label, a result of three-value allocation $g_p$ in a certain pixel p is expressed as follows:

$$g_p = \begin{cases} 1, & t_p + w_p < I_p \\ 0, & t_p - w_p \le I_p \le t_p + w_p \\ -1, & I_p < t_p - w_p \end{cases}$$

"1" denotes white label, "0" denotes gray label, and "−1" denotes black label. The threshold value t may be set to the same value as a threshold value used for binarization in normal spatial encoding, as in the first exemplary embodiment. The value of the luminance range w of gray label is determined based on the degree of reliability of a pixel of interest p, which is described below. Since the label allocation unit 303 performs three-value allocation without forcibly binarizing ambiguous portions near the threshold value, the second label change unit 306 in a later stage can accurately determine the labels. Furthermore, since the usage of MMSW patterns contributes to relatively high contrast and the high degree of reliability, it is possible to lessen the rate at which gray labels are allocated. The label allocation unit 303 outputs the result of three-value allocation obtained in this way to the label change unit 304.

The degree of reliability and the luminance range w of gray label are described. The degree of reliability is a value that can be determined based on a label error rate in the pixel of interest p, a signal-to-noise (SN) ratio, and the magnitude of luminance. For example, in two images captured by respectively projecting a pattern composed only of bright portions and a pattern composed only of dark portions onto a measurement target, it is considered that a pixel in which the luminance of the image captured by projecting a pattern composed only of dark portions is higher has an error since the SN ratio of the projection patterns is low. Therefore, a window with the appropriate size relative to the pixel of interest p is considered, and the ratio of pixels having an error to pixels in the neighborhood region is set as a label error rate. Then, a difference between "1" and the label error rate is defined as the degree of reliability. Since the lower the degree of reliability, the harder it is to determine whether to set the target label to a white label or black label, the number of pixels labeled with a gray label is apt to greatly increase. Therefore, the higher the degree of reliability of the pixel of interest p, the value of the luminance range w of gray label is larger, and, the lower the degree of reliability, the value of the luminance range w of gray label is smaller. Setting the threshold value in this way enables keeping the number of pixels labeled with a gray label to a certain range.

(Step S34)

In step S34, the label change unit 304, which has received three-valued labels, optimizes and determines (changes) the labels of the respective pixels to probable or likely labels based on the spatial neighborhood information. In other words, the label change unit 304 optimizes, as initial values, the result of three-valued allocation input from the label allocation unit 303 with the use of information that labels are likely to be the same in a spatial neighborhood in the captured image, and determines the labels. Since the striped pattern is a pattern with a certain width of stripe and the spatial resolution of the imaging apparatus 2 is generally higher than that of the projection apparatus 1, the width of bright or dark stripe in the projection pattern corresponds to a plurality of imaging pixels. Therefore, considering neighbor pixels (for example, eight neighbor pixels) of the pixel of interest in the captured image, the neighbor pixels are likely to have the same label as that of the pixel of interest. If this is used to determine the label of the pixel of interest, for example, by the majority of labels in the neighbor pixels, the more probable label can be allocated to the pixel of interest. Here, the following cost function C is designed, and such a combination of labels G as to minimize costs is obtained.

$$C(G) = \sum_{p \in V} D_p(G_p, g_p) + \lambda \sum_{(p,q) \in E} W_{pq}(G_p, g_p)$$

$$D_p(G_p, g_p) = |G_p - g_p|$$

$$W_{pq}(G_p, g_p) = |G_p - g_p|$$

V denotes a set of all the pixels, and E denotes a set of neighbor pixels corresponding to all the pixels. Furthermore, p denotes a pixel of interest, and q is a suffix indicating a neighbor pixel. Data cost D indicates which label is appropriate considering solely the pixel of interest p. Smooth cost W indicates which label is appropriate considering the relationship between the label of the neighbor pixel q and the pixel of interest p. λ denotes a weight. The greater the weight λ, the influence of the smooth cost W becomes greater, so that a strongly smoothed surface results. Although designing of the data cost D and the smooth cost W is performed using only information about the labels in the above formulae, it may be performed using luminance information about the captured image. The method of minimizing the cost function C includes various methods such as Iterated Conditional Modes, Graph Cut, and Belief Propagation, whichever may be used. In this way, the label change unit 304 reduces a label allocation error occurring due to the large influence of noise. Then, the label change unit 304 outputs the optimized result of three-valued allocation to the edge detection unit 305.

(Step S35)

In step S35, the edge detection unit 305 detects a sub-pixel edge based on the optimized result of three-valued allocation input from the label change unit 304.

Figure 16:
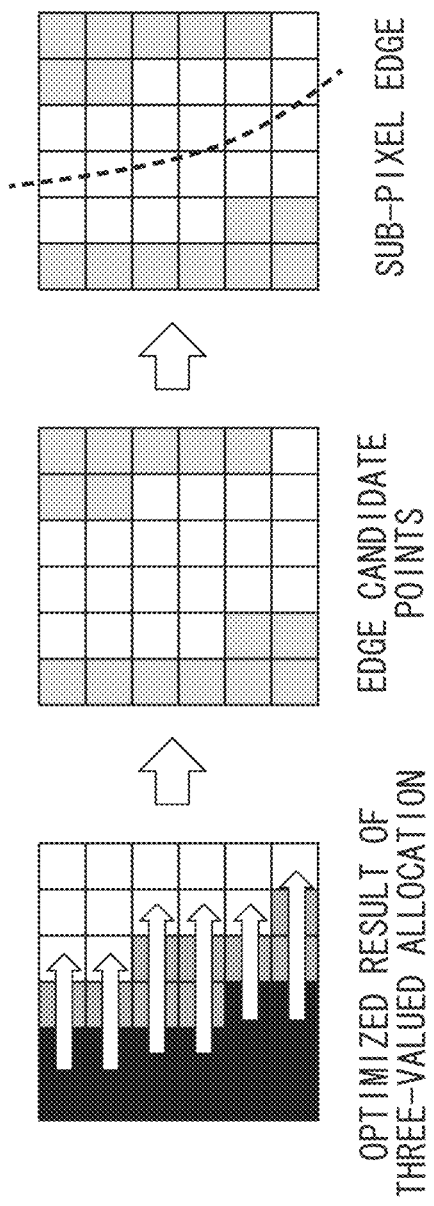
FIG. 16 illustrates processing performed by an information processing apparatus according to the third exemplary embodiment.

FIG. 16 illustrates processing performed by the edge detection unit 305. Since it is considered that there is an edge near the gray labels, first, the edge detection unit 305 scans the result of three-valued allocation in the horizontal direction of the image (or in the vertical direction of the image if the edge extends in the horizontal direction) to extract regions of gray labels and its neighbor white and black labels, and sets the extracted regions as edge candidate points. Then, the edge detection unit 305 obtains a sub-pixel edge, which passes approximately through the center of the edge candidate points, by performing, for example, function fitting. The edge detection unit 305 outputs the obtained sub-pixel edge to the second label change unit 306.

(Step S36)

In step S36, the second label change unit 306 detects an edge position based on the obtained sub-pixel edge, and changes a gray label to a binary white or black label.

Figure 17:
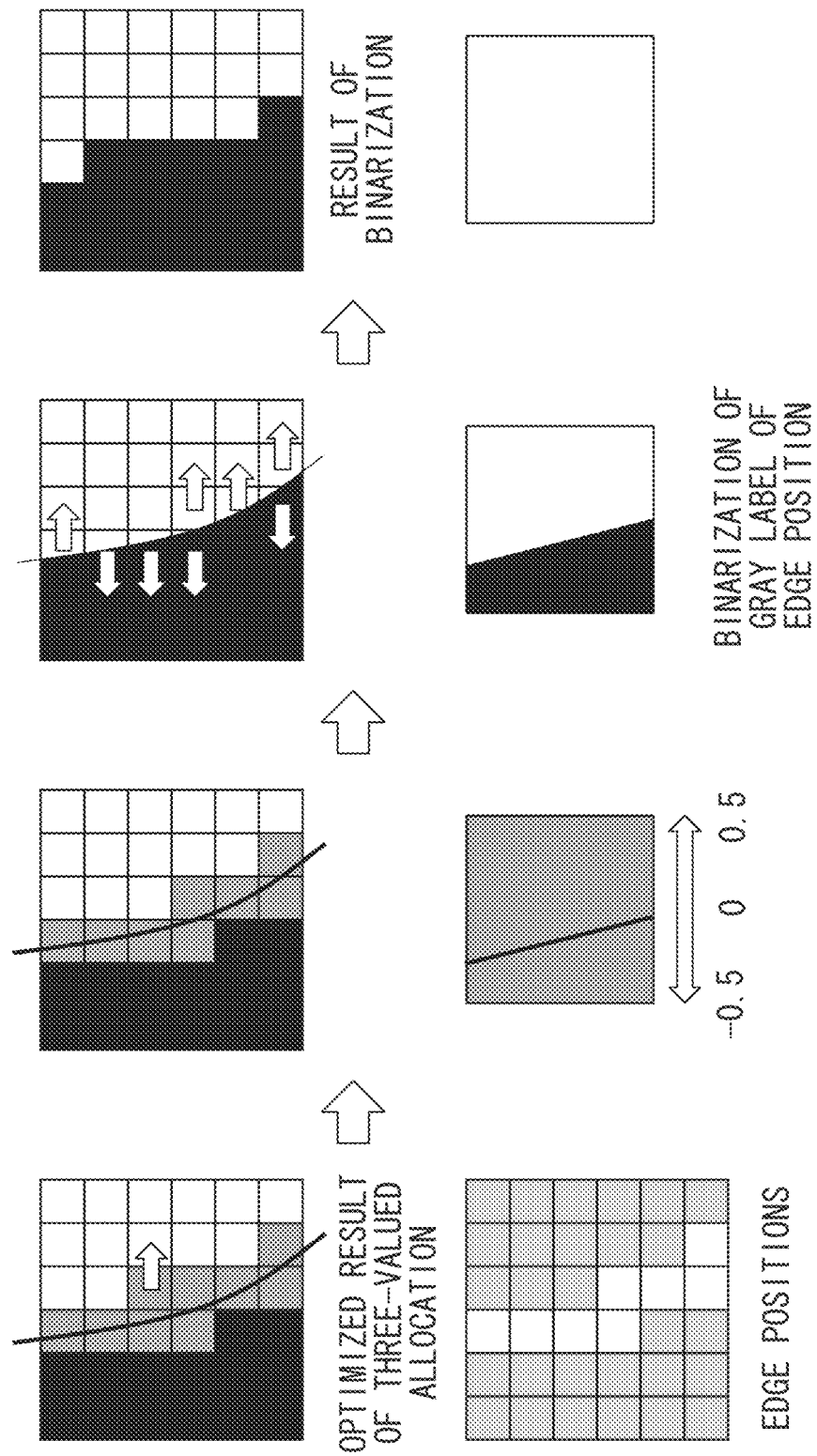
FIG. 17 illustrates processing performed by the information processing apparatus according to the third exemplary embodiment.

FIG. 17 illustrates processing performed by the second label change unit 306. First, the second label change unit 306 obtains an edge position (boundary position), which is the position of each pixel through which the sub-pixel edge passes. With respect to gray labels other than those at the edge position, the second label change unit 306 determines the respective labels based on the labels on the right and left sides (the upper and lower sides if the edge extends in the horizontal direction) of the edge position. For example, in the example illustrated in FIG. 17, the second label change unit 306 changes a portion of the gray label to a black label if the portion is present on the left side of the edge position, and changes a portion of the gray label to a white label if the portion is present on the right side of the edge position. Then, the second label change unit 306 changes the gray label at the edge position to a label the area of a portion of the pixel of which is wider than the area of the other portion thereof among the portions of the pixel on the right and left sides across the sub-pixel edge. As in the case of an example illustrated in the lower portion of FIG. 17, if the sub-pixel edge is nearer the left side in a certain pixel at the edge position, since the area of a portion of the pixel on the right side of the sub-pixel edge is wider than the area of the other portion of the pixel, the second label change unit 306 changes the gray label at the pixel to a white label. In this way, the second label change unit 306 obtains the edge position and a result of binarization. In addition, the edge position does not need to be limited to pixels through which the sub-pixel edge passes, but may be extended to a certain width of pixels.

(Step S37)

In step S37, the second label change unit 306 determines whether the projection, imaging, and processing have been completed for all the pattern images. Step S32 to step S36 are repeated until it is determined that the processing has been completed, thus enabling obtaining a correspondence relationship between projection coordinates and image coordinates by spatial encoding. If any pattern image to be processed yet remains, the second label change unit 306 stores the obtained result of three-valued allocation and the sub-pixel edge of the current pattern image, and then processing for the next pattern image is performed. When the processing for all the pattern images has been completed, the second label change unit 306 integrates results of binarization and sub-pixel edge information about all the pattern images, and obtains a correspondence relationship between projection coordinates and image coordinates by spatial encoding. Then, the second label change unit 306 the obtained correspondence relationship between projection coordinates and image coordinates to the three-dimensional coordinate calculation unit 307.

(Step S38)

In step S38, the three-dimensional coordinate calculation unit 307 calculates three-dimensional coordinates from the correspondence relationship between projection coordinates and image coordinates, and sends the calculated three-dimensional coordinates to the output unit 308. Then, the output unit 308 outputs data of the three-dimensional coordinates, and the processing ends.

In addition, processing in step S32 does not need to be included in the repetition. After, in step S32, the projection and imaging have been completed for all the patterns, processing from step S33 to step S36 may be repeated or may be performed in parallel.

In this way, using spatial neighborhood information with the use of a group of patterns that does not include thin striped patterns enables reducing the influence of noise occurring in a captured image and calculating three-dimensional coordinates with high precision.

A fourth exemplary embodiment is directed to a three-dimensional measurement apparatus, which, when using multiple luminance levels of patterns for projection and allocating binarized labels indicating the presence or absence of projection, allocates a label indicating ambiguity to an ambiguous region using more multilevel labels than multiple projection luminance levels. By correcting an ambiguous label to a label corresponding to a projection luminance level in processing at a subsequent stage based on spatial neighborhood information, the three-dimensional measurement apparatus can prevent a discrimination error in a measurement target region from occurring under the influence of noise and can calculate high-precision three-dimensional coordinates.

[Configuration of Apparatus]

A configuration of an information processing apparatus 4100 according to the fourth exemplary embodiment is described below. The information processing apparatus 4100 includes a projection control unit 401, an image input unit 402, a label allocation unit 403, a label change unit 404, an edge detection unit 405, a second label change unit 406, a three-dimensional coordinate calculation unit 407, and an output unit 408. The block diagram according to the fourth exemplary embodiment is the same as that of the third exemplary embodiment (FIG. 15) and is, therefore, omitted from the drawings. In FIG. 15, reference numerals "3100", "301", "302", "303", "304", "305", "306", "307", and "308" in the third exemplary embodiment are replaced by reference numerals "4100", "401", "402", "403", "404", "405", "406", "407", and "408", respectively, in the fourth exemplary embodiment. The configuration of the fourth exemplary embodiment is the one obtained by modifying a part of the configuration illustrated in FIG. 15. Here, only portions different from those in the third exemplary embodiment are mainly described.

Figure 19:
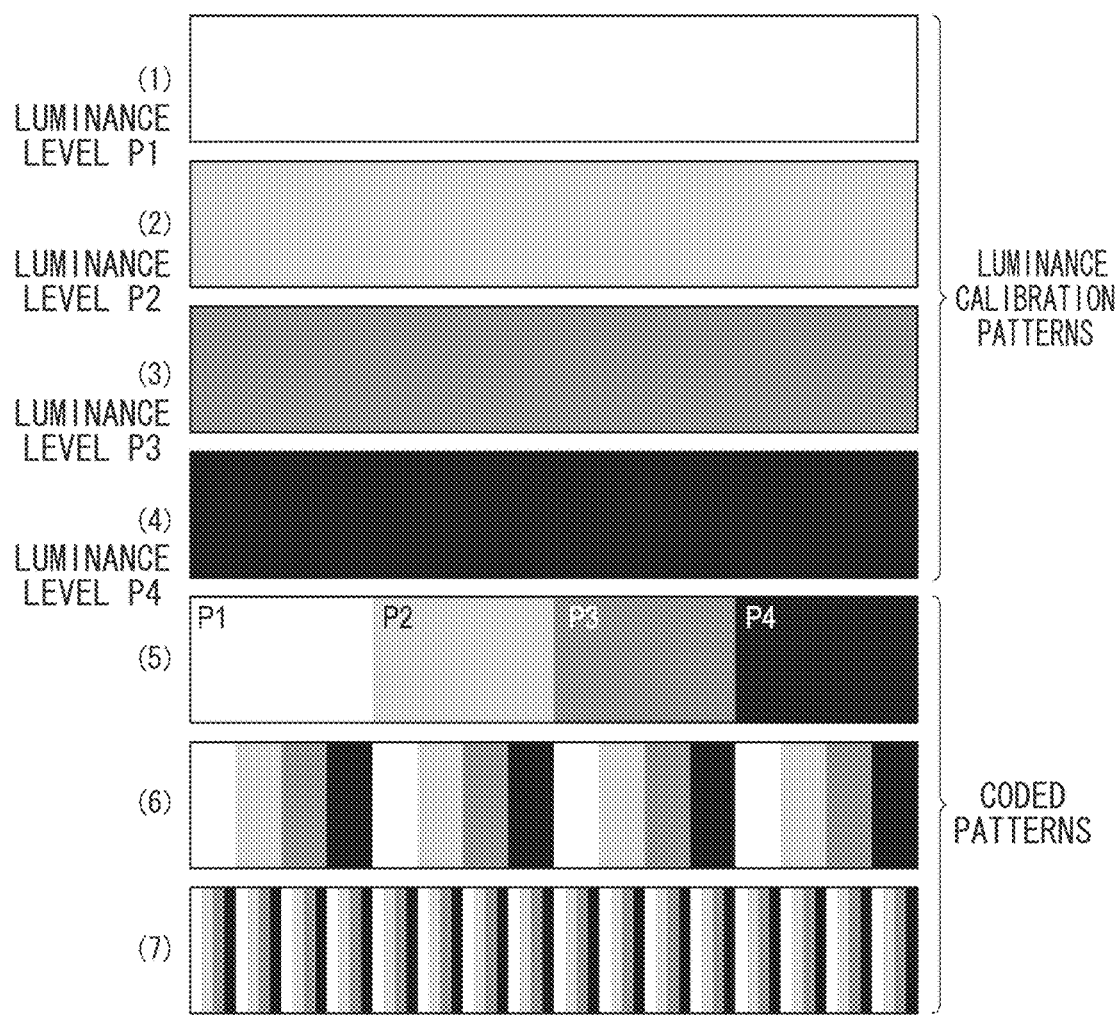
FIG. 19 illustrates examples of projection patterns with multivalued luminance levels.

The projection control unit 401 stores pattern images having multiple luminance levels P1, P2, ..., Pm, in m steps (p1>p2> ... >Pm without loss of generality), illustrated in FIG. 19 (m=4 in FIG. 19). The projection control unit 401 controls the projection apparatus 1 to project patterns in order for every image capturing and simultaneously outputs a control signal to the image input unit 402. However, the projection of patterns and capturing of images are performed in no particular order. Alternatively, patterns may be projected divisionally with respective wavelengths of pattern light and imaging apparatuses associated with the respective wavelengths may be used, so that all the patterns may be simultaneously projected to be used for capturing images. In an example of patterns illustrated in FIG. 19, patterns (1) to (4) are luminance calibration patterns used for obtaining the observed luminance values when patterns with the respective luminance levels are projected onto a target object, and patterns (5) to (7) are coded patterns used for space division. When multivalued patterns are used, since the number of regions that are able to be discriminated for every image capturing increases, a correspondence relationship between the projection apparatus 1 and the imaging apparatus 2 can be obtained with a less number of captured images. For example, in the case of a normal bright and dark pattern as in Gray code, each time a new coded pattern is projected for one image capturing, the number of regions that are able to be uniquely discriminated increases to double. On the other hand, in the case of the example illustrated in FIG. 19, since each coded pattern is a pattern having four-step luminance levels, the number of regions that are able to be uniquely discriminated increases to quadruple each time a new coded pattern is projected for one image capturing.

The label change unit 404 changes labels using the fact that spatially neighbor labels are likely to be the same.

The edge detection unit 405 obtains a sub-pixel edge based on a result of multivalued allocation.

The second label change unit 406 determines the result of multivalued allocation as labels corresponding the luminance levels of a projection pattern based on the sub-pixel edge.

The label allocation unit 403 allocates labels L1, L2, ..., Lm, which respectively correspond to m-step luminance values of a captured image with the projected pattern, and an undetermined label U, which does not belong to the labels L1, L2, ..., Lm.

The label change unit 404 optimizes, as initial values, the result of multivalued allocation input from the label allocation unit 403 and determines labels, as in the third exemplary embodiment. Then, the label change unit 404 outputs the optimized result of multivalued allocation to the edge detection unit 405.

The edge detection unit 405 detects a sub-pixel edge based on the optimized result of multivalued allocation input from the label change unit 404, as in the third exemplary embodiment. Then, the edge detection unit 405 outputs the obtained sub-pixel edge to the second label change unit 406.

The second label change unit 406 changes the undetermined label U to a label Li corresponding to the luminance level of a projection pattern according to the sub-pixel edge input from the edge detection unit 405, thus performing spatial encoding. Processing performed by the second label change unit 406 is the same as the processing performed by the second label change unit 306 in the third exemplary embodiment if a gray label described in the third exemplary embodiment is replaced by an undetermined label U and a white label and a black label are replaced by a label pair included in a set Φ, which is described below, and is, therefore, omitted from description. In this way, the edge position and the result of multivalued allocation are obtained.

The other operations of the information processing apparatus 4100 are the same as those in the third exemplary embodiment, and are, therefore, omitted from description.

[Measurement Processing]

Figure 20:
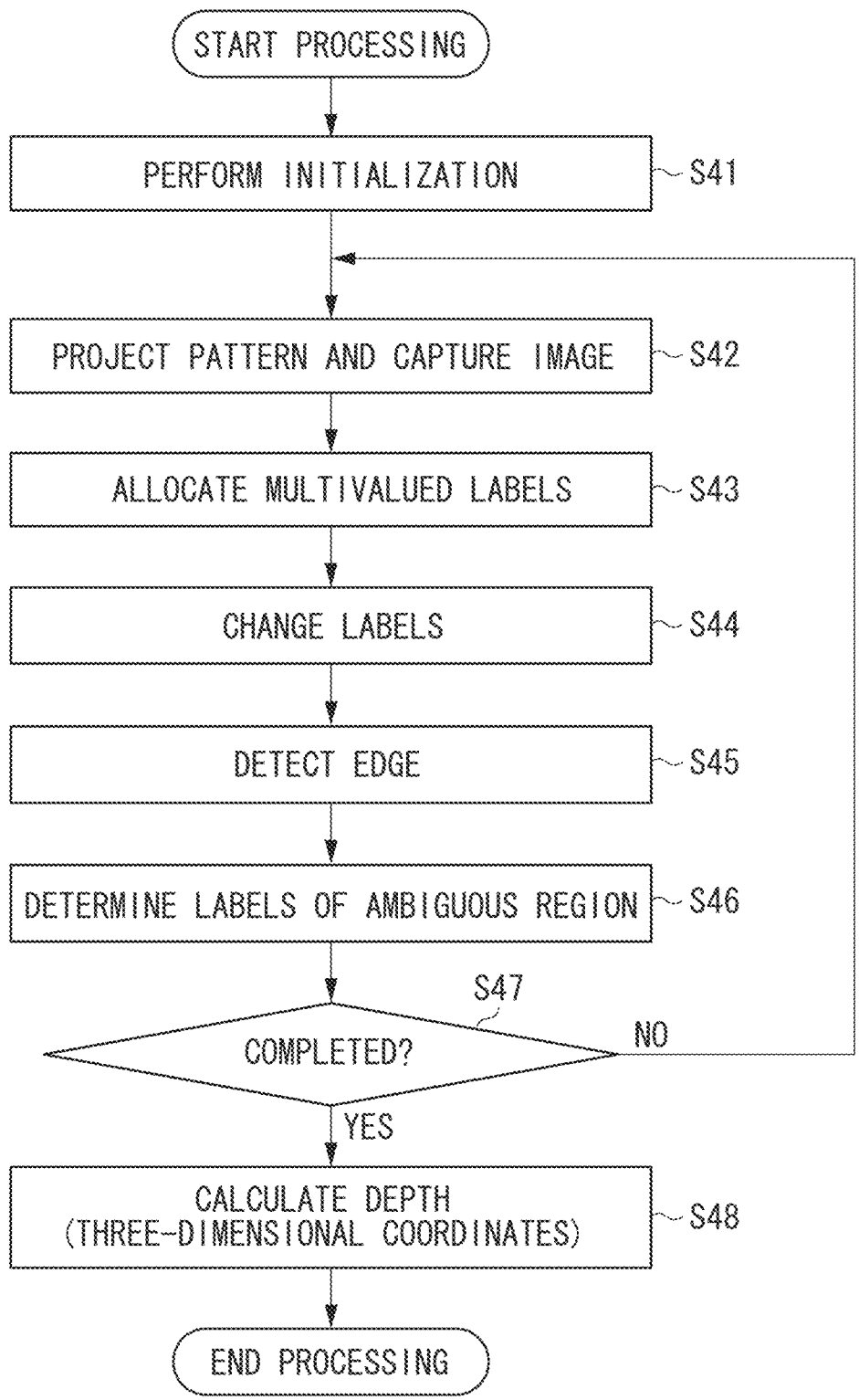
FIG. 20 is a flowchart illustrating processing performed by an information processing apparatus according to a fourth exemplary embodiment.

Measurement processing performed by the three-dimensional measurement apparatus 4000 according to the fourth exemplary embodiment is described with reference to the flowchart of FIG. 20. However, most of the measurement processing in the fourth exemplary embodiment is the same as in the third exemplary embodiment, and is, therefore, omitted from description. In FIG. 20, only steps different from those in the third exemplary embodiment are described.

(Step S42)

In step S42, the projection control unit 401 causes the projection apparatus 1 to project multivalued patterns such as those illustrated in FIG. 19, and simultaneously sends a control signal to the image input unit 402. The image input unit 402, which has received the control signal, causes the imaging apparatus 2 to capture an image with the projected pattern, and sends the captured image to the label allocation unit 403.

(Step S43)

In step S43, the label allocation unit 403, which has received the captured image, allocates multivalued labels to the captured image with the projected pattern. The label allocation unit 403 allocates labels L1, L2, ..., Lm, which respectively correspond to m-step luminance values of a captured image with the projected pattern, and an undetermined label U, which does not belong to the labels L1, L2, ..., Lm. With such a label U introduced, the label allocation unit 403, without forcibly determining labels of portions that are ambiguous and that are unable to be determined in the present stage, can determine labels with higher precision using spatial information in a subsequent stage. Therefore, the label allocation unit 403 can reduce any label allocation error in the vicinity of the edge, at which label allocation is difficult.

The method of allocating multivalued labels mentioned in the foregoing is described. First, in an image captured by projecting, onto a target object, the luminance calibration patterns (1) to (4), which are patterns with the respective luminance levels Pi (i=1, 2, ..., m) among the projection patterns illustrated in FIG. 19, the luminance value observed at a certain pixel p is denoted by $I_p(Pi)$. Then, the coded patterns (5) to (7) illustrated in FIG. 19 are projected in sequence and images with the projected patterns are captured. With respect to the images captured with the respective coded patterns projected, the result of multivalued allocation $g_p$ at the pixel p, when the luminance of the captured image is denoted by $I_p$ and the luminance range within which luminance levels are regarded as each luminance level is denoted by $w_p(Pi)$, is expressed as follows:

$$g_p = \begin{cases} Li, & I_p(Pi) - w_p(Pi) < I_p < I_p(Pi) + w_p(Pi) \\ U, & \text{other than the above} \end{cases}$$

The luminance range $w_p(Pi)$ may be determined based on a standard deviation in the luminance value $I_p(Pi)$ of the imaging apparatus 2. However, this is not limiting. The value of the luminance range $w_p(Pi)$ may be determined, for example, based on a ratio, such as 0.1 times, of $I_p(Pi)$, or may be an appropriate fixed value. The label allocation unit 403 outputs the obtained result of multivalued allocation to the label change unit 404. Furthermore, the undetermined label U does not need to be limited to one label, but multivalued labels may be allocated according to between which luminance values the luminance is.

(Step S44)

In step S44, the label change unit 404 designs the following cost function C to obtain such a label combination G as to minimize costs (evaluate costs):

$$C(G) = \sum_{p \in V} D_p(G_p, g_p) + \lambda \sum_{(p,q) \in E} W_{pq}(G_p, g_p)$$

$$D_p(G_p, g_p) = \begin{cases} 0, & \text{both } G_p \text{ and } g_p \text{ are } U \\ 1, & \text{either } G_p \text{ or } g_p \text{ is } U \\ |f(G_p) - f(g_p)|, & \text{other than the above} \end{cases}$$

$$W_{pq}(G_p, g_p) = h(G_p, g_p)$$

where $$f(Li) = i$$

$$h(A, B) = \begin{cases} 0, & A = B \\ 1, & A \neq B \text{ and } "A = U \text{ or } B = U" \\ 2, & A \neq B \text{ and } A \neq U \text{ and } B \neq U \text{ and } (A, B) \in \Phi \\ 3, & A \neq B \text{ and } A \neq U \text{ and } B \neq U \text{ and } (A, B) \notin \Phi \end{cases}$$

The description of each symbol or character is the same as in the third exemplary embodiment, and is, therefore, not repeated. Only the new defined set Φ and functions f and h are described here. The set Φ includes, as an element, a pair of labels (Li, Lj) (a pair of pixels) corresponding to luminance levels adjacently located in a projection pattern, and is defined for each projection pattern. For example, in the pattern (5) illustrated in FIG. 19, Φ={(L1, L2), (L2, L3), (L3, L4)}. In the pattern (6), Φ={(L1, L2), (L2, L3), (L3, L4), (L4, L1)}. The function f, which is used for data cost calculation, is a function of a label corresponding to a luminance value, and returns the index indicating the order of magnitude of the luminance value. As the data cost D changes to a label the luminance level of which is greatly different, the function f provides higher cost. The function h, which is used for smooth cost calculation, performs calculations as cost 0 if two labels to be compared are the same, as cost 1 if two labels are different and one of the labels is an undetermined label U, as cost 2 if two labels are different, neither of the labels is an undetermined label U, and the labels are a pair of labels that may be adjacently located in a projection pattern, and as cost 3 if two labels are different, neither of the labels is an undetermined label U, and the labels are a pair of labels that cannot be adjacently located in a projection pattern. However, the method of determining the data cost D or the smooth cost W is not limited to this. The value or condition of such a cost also changes according to the characteristics of projection patterns. The label change unit 404 outputs the optimized result of multivalued allocation to the edge detection unit 405.

(Step S45)

In step S45, the edge detection unit 405 detects a sub-pixel edge based on the optimized result of multivalued allocation input from the label change unit 404 as in the third exemplary embodiment. In the case of the third exemplary embodiment, the edge detection unit 305 sets a gray label and its neighbor white and black labels as edge candidate points. However, in the fourth exemplary embodiment, in a case where a label U and its neighbor label are a label pair included in the set Φ, the edge detection unit 405 sets those labels as edge candidate points. Then, the edge detection unit 405 obtains a sub-pixel edge that passes through the vicinity of the center of the edge candidate points, by performing, for example, function fitting on the edge candidate points. (Step S46)

In step S46, the second label change unit 406 detects the edge position based on the obtained sub-pixel edge, and changes undetermined labels to labels corresponding to the respective luminance levels of the projection pattern. More specifically, the second label change unit 406 changes an undetermined label U to a label Li corresponding to the luminance level of a projection pattern according to the sub-pixel edge input from the edge detection unit 405, thus performing spatial encoding. Processing performed by the second label change unit 406 is the same as the processing performed by the second label change unit 306 in the third exemplary embodiment if a gray label described in the third exemplary embodiment is replaced by an undetermined label U and a white label and a black label are replaced by a label pair included in the set Φ, and is, therefore, omitted from description.

In this way, projecting multivalued patterns with multistep luminance levels, performing allocation of labels including undetermined labels, and using spatial neighborhood information enable reducing the influence of noise occurring in a captured image and calculating high-precision three-dimensional coordinates with a less number of captured images.

In the first exemplary embodiment and the second exemplary embodiment, the method of calculating high-precision three-dimensional coordinates by using the features of a group of spatially divided patterns has been described. In the third exemplary embodiment and the fourth exemplary embodiment, the method of calculating high-precision three-dimensional coordinates by allocating a label indicative of ambiguity and using spatial neighborhood information has been described. Then, in a fifth exemplary embodiment, in order to calculate higher-precision three-dimensional coordinates, these two methods are integrated to correct and determine any error of discrimination of measurement target regions occurring under the influence of noise.

[Configuration of Apparatus]

Figure 21:
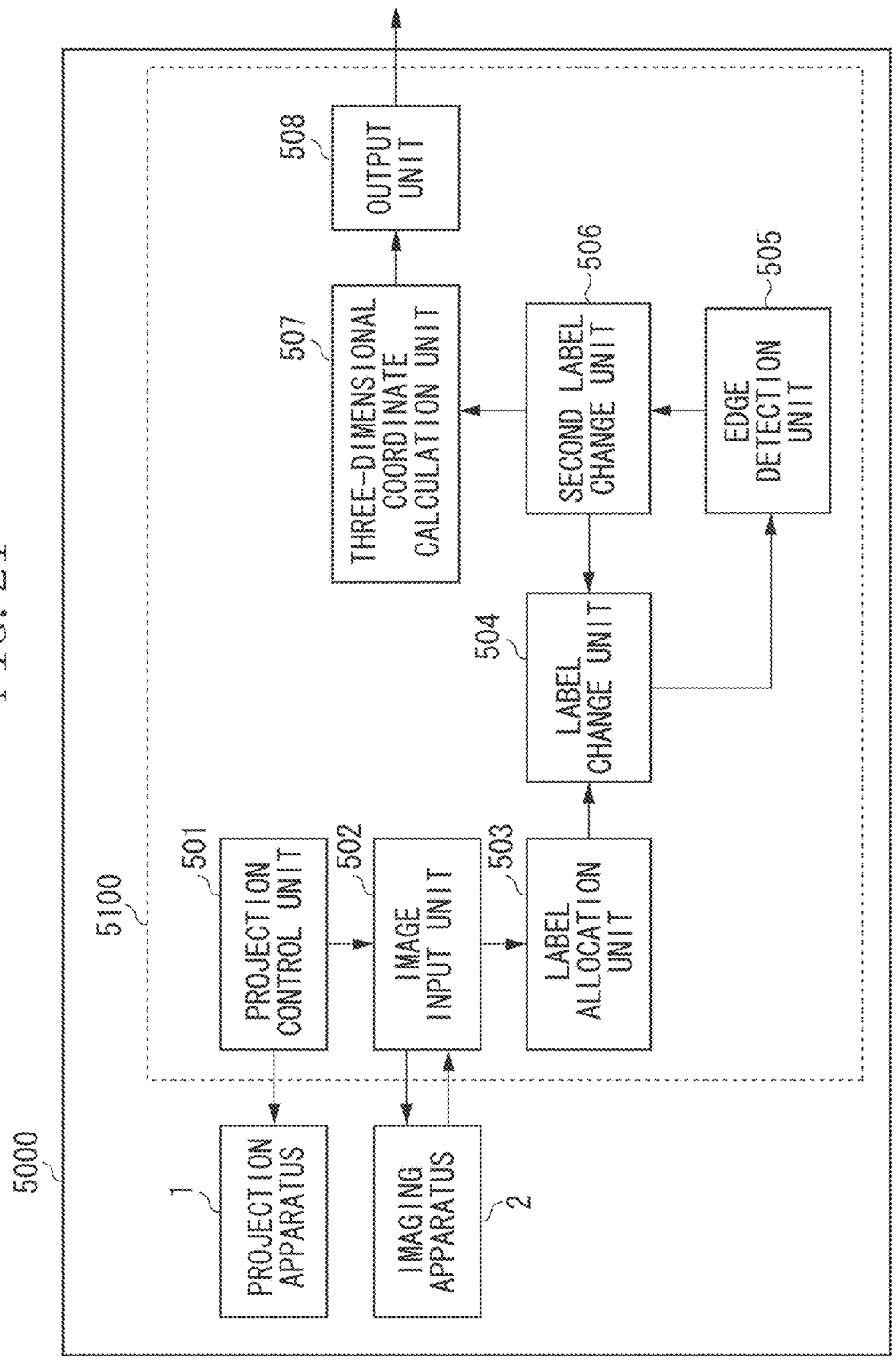
FIG. 21 is a block diagram illustrating a configuration example of an information processing apparatus according to a fifth exemplary embodiment.

FIG. 21 is a block diagram illustrating an information processing apparatus 5100 according to the fifth exemplary embodiment. The information processing apparatus 5100 according to the fifth exemplary embodiment includes a projection control unit 501, an image input unit 502, a label allocation unit 503, a label change unit 504, an edge detection unit 505, a second label change unit 506, a three-dimensional coordinate calculation unit 507, and an output unit 508.

Information processing performed by the information processing apparatus 5100 according to the fifth exemplary embodiment is described with reference to the block diagram of FIG. 21. Here, as a method obtained by integrating the first exemplary embodiment and the third exemplary embodiment, a method using the features of a group of Gray code patterns and spatial neighborhood information is described.

The label allocation unit 503 allocates three-valued labels according to luminance values of a captured image.

The label change unit 504 changes labels with the use of characteristics of patterns as in the first and second exemplary embodiments, and then changes labels with the use of the fact that spatially neighbor labels are likely to be the same as in the third and fourth exemplary embodiments. The details of such processing are described below.

The edge detection unit 505 detects a sub-pixel edge based on a result of three-valued allocation.

The second label change unit 506 may change labels in consideration of labels of neighbor pixels as in the third exemplary embodiment. However, since, in the case of Gray code patterns, labels on the right and left sides of the sub-pixel edge (the upper and lower sides if the edge extends in the horizontal direction) are determined by the labels of lower-frequency patterns, the second label change unit 506 may also change labels according to such characteristics. For example, as illustrated in FIG. 2, in Gray code, it is previously determined that, in a sub-pixel edge of the pattern 3 within a region which is a bright portion in the pattern 1 and is a dark portion in the pattern 2, a portion on the left side of the sub-pixel edge is a bright portion and a portion on the right side of the sub-pixel edge is a dark portion. On the other hand, it is previously determined that, in a sub-pixel edge of the pattern 3 within a region which is a bright portion in the pattern 1 and is a bright portion in the pattern 2, a portion on the left side of the sub-pixel edge is a dark portion and a portion on the right side of the sub-pixel edge is a bright portion. If any pattern to be processed still remains, the second label change unit 506 stores the obtained result of binarization of patterns and the sub-pixel edge and outputs the edge position to the label change unit 504.

In this way, processing ambiguous three-valued labels in order from a lower-frequency pattern of Gray code, allocating more probable labels, and then optimizing the labels enable obtaining less erroneous labels than in the first exemplary embodiment or the third exemplary embodiment.

[Measurement Processing]

Measurement processing performed by the three-dimensional measurement apparatus 5000 according to the fifth exemplary embodiment is described with reference to the flowchart of FIG. 22.

Figure 22:
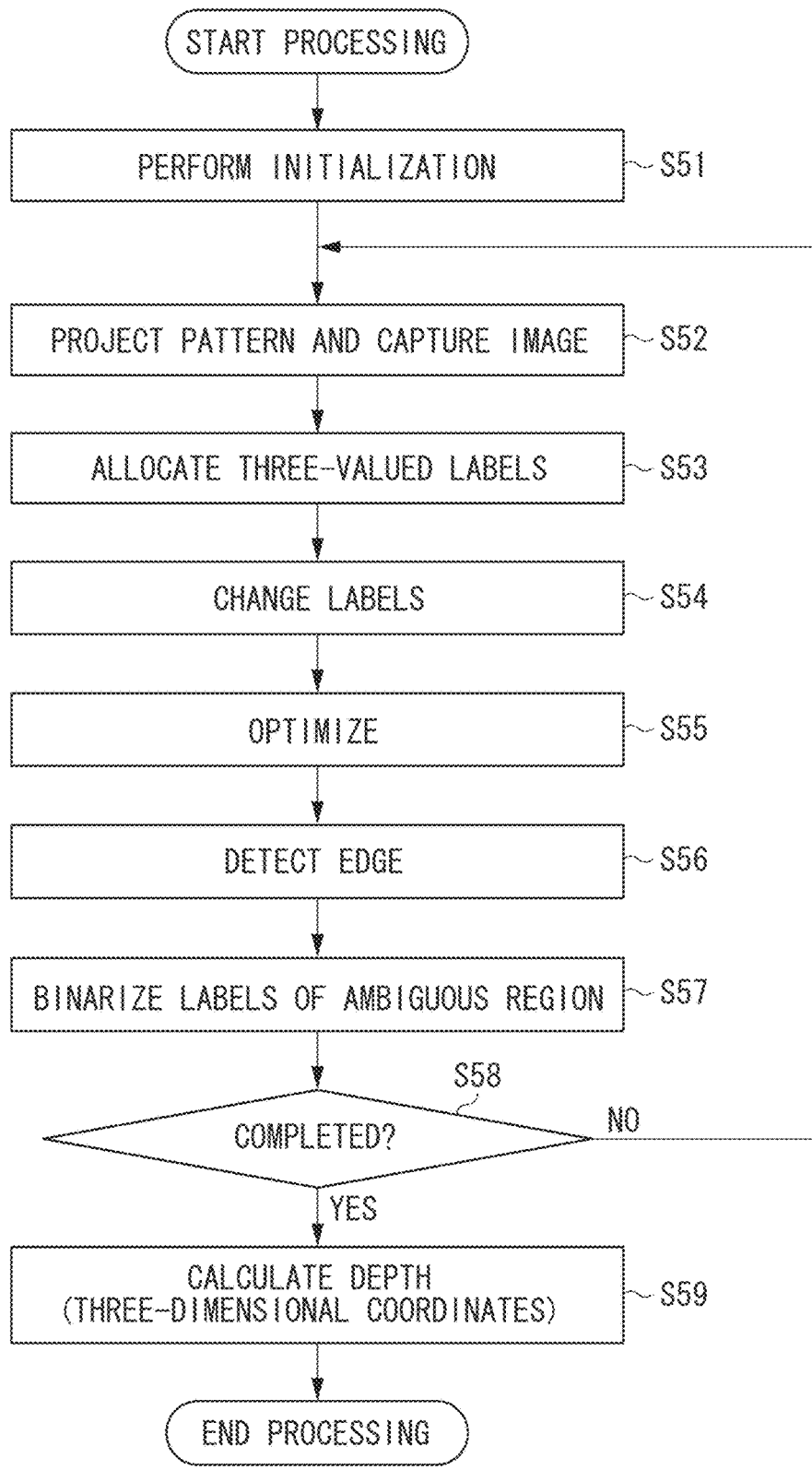
FIG. 22 is a flowchart illustrating processing performed by the information processing apparatus according to the fifth exemplary embodiment.

Step S53, step S55, step S56, and step S57 are approximately the same as the corresponding steps in the third exemplary embodiment, and the other steps in FIG. 22 are approximately the same as the corresponding steps in the first exemplary embodiment.

In addition, processing in step S52 does not need to be included in the repetition in FIG. 22. After, in step S52, the projection and imaging have been completed for all the patterns, processing from step S53 to step S57 may be repeated or may be performed in parallel. Moreover, processing in step S53 and step S54 does not need to be performed in the order illustrated in FIG. 22, but may be performed in the order changed as appropriate.

In this way, using the features of Gray code patterns and spatial neighborhood information enables reducing the influence of noise occurring in a captured image and calculating three-dimensional coordinates with higher precision.

(Example of Modification)

Although, in each of the first exemplary embodiment to the fifth exemplary embodiment, an example of performing three-dimensional measurement has been described, calibration for projection mapping may be performed based on the obtained correspondence relationship between projection coordinates and image coordinates. Generally, displaying content in projection mapping does not require the use of the imaging apparatus 2. However, at the time of calibration for projection mapping, it is necessary to obtain a correspondence relationship indicating which region of a projection target is irradiated with projection light. Therefore, the imaging apparatus 2 can be used to capture images with projected patterns based on any one of the methods described in the first to fifth exemplary embodiments, so that a mapping relationship of projection light to the projection target can be obtained.

Other Embodiments

Embodiments of the present disclosure can also be realized by a computer of a system or apparatus that reads out and executes computer executable instructions recorded on a storage medium (e.g., a non-transitory computer-readable storage medium) to perform the functions of one or more of the above-described embodiment(s) of the present disclosure, and by a method performed by the computer of the system or apparatus by, for example, reading out and executing the computer executable instructions from the storage medium to perform the functions of one or more of the above-described embodiment(s). The computer may comprise one or more of a central processing unit (CPU), micro processing unit (MPU), or other circuitry, and may include a network of separate computers or separate computer processors. The computer executable instructions may be provided to the computer, for example, from a network or the storage medium. The storage medium may include, for example, one or more of a hard disk, a random access memory (RAM), a read-only memory (ROM), a storage of distributed computing systems, an optical disk (such as a compact disc (CD), digital versatile disc (DVD), or Blu-ray Disc (BD)), a flash memory device, a memory card, and the like.

While the present disclosure has been described with reference to exemplary embodiments, it is to be understood that the disclosure is not limited to the disclosed exemplary embodiments. The scope of the following claims is to be accorded the broadest interpretation so as to encompass all such modifications and equivalent structures and functions.

This application claims the benefit of priority from Japanese Patent Applications No. 2015-033365 filed Feb. 23, 2015 and No. 2015-033366 filed Feb. 23, 2015, which are hereby incorporated by reference herein in their entirety.

What is claimed is:

1. An information processing apparatus comprising:
one or more memories storing instructions; and
one or more processors that, when executing the instructions, causes the information processing apparatus to:
acquire a plurality of images obtained by imaging a target object onto which a plurality of patterns having a bright portion and a dark portion are projected in a time series by a projector;
allocate, to each pixel in the plurality of images, a label corresponding to luminance of the pixel by referring to a characteristic of the plurality of patterns;
change the allocated label based on a time-series change of luminance of the projected plurality of patterns;
derive correspondence relationships between positions of the plurality of patterns in a projection plane of the projector and positions of the plurality of patterns in the acquired image based on the changed label; and
derive three-dimensional coordinates of a surface of the target object based on the derived correspondence relationships.

2. The information processing apparatus according to claim 1, wherein the instructions further cause the information processing apparatus to change the allocated label based on whether a change of labels of adjacent pixels in each image exists in a change of luminance of the projected plurality of patterns.

3. The information processing apparatus according to claim 1, wherein the instructions further cause the information processing apparatus to allocate respective different labels according to whether the luminance of each pixel in the image is greater than a threshold value or is less than the threshold value.

4. The information processing apparatus according to claim 1, wherein the plurality of patterns are Gray code patterns.

5. The information processing apparatus according to claim 1, wherein the instructions further cause the information processing apparatus to derive three-dimensional coordinates of a surface of the target object with a boundary position between the bright portion and the dark portion of the plurality of patterns included in the plurality of images set as a measurement point.

6. An information processing apparatus comprising:
one or more memories storing instructions; and
one or more processors that, when executing the instructions, causes the information processing apparatus to:
acquire an image obtained by imaging a target object onto which a pattern having a bright portion and a dark portion is projected by a projector;
detect a boundary position between the bright portion and the dark portion of the pattern in the image;
allocate, to a pixel in the image, a label corresponding to luminance of the pixel by referring to a characteristic of the pattern;
change the allocated label based on a time-series change of luminance of a projected plurality of patterns
derive a correspondence relationship between a position of the pattern in a projection plane of the projector and a position of the pattern in the acquired image based on the changed label; and
derive three-dimensional coordinates of a surface of the target object based on the derived correspondence relationship.

7. The information processing apparatus according to claim 6, wherein the instructions further cause the information processing apparatus to detect the boundary position based on the allocated label.

8. The information processing apparatus according to claim 6, wherein the instructions further cause the information processing apparatus to:
allocate a first label to a pixel having a luminance value larger than a first threshold value, allocate a second label to a pixel having a luminance value smaller than the first threshold value and larger than a second threshold value, and allocate a third label to a pixel having a luminance value smaller than the second threshold value; and
change the label of a pixel having the second label to the first label or the third label in view of the boundary position.

9. The information processing apparatus according to claim 8, wherein the first threshold value and the second threshold value are determined based on a degree of reliability of the labels.

10. The information processing apparatus according to claim 8, wherein the instructions further cause the information processing apparatus to:
detect the boundary position based on a pixel having the second label and adjacent pixels having respective different labels; and
change the label of a pixel having the second label to the first label or the third label based on a distribution of the labels of pixels neighboring the boundary position.

11. The information processing apparatus according to claim 8, wherein the instructions further cause the information processing apparatus to change the label of a pixel having the second label to the first label or the third label based on a characteristic of the pattern.

12. The information processing apparatus according to claim 8, wherein the instructions further cause the information processing apparatus to change the label allocated to the associated pixel based on luminance values or labels of a plurality of pixels neighboring the associated pixel.

13. The information processing apparatus according to claim 6, wherein the pattern includes a plurality of patterns that is projected in time series, and
wherein the instructions further cause the information processing apparatus to allocate the label further in view of a time-series change of luminance of the projected plurality of patterns.

14. The information processing apparatus according to claim 6, wherein the pattern is a Gray code pattern.

15. An information processing method comprising:
acquiring a plurality of images obtained by imaging a target object onto which a plurality of patterns having a bright portion and a dark portion are projected by a projector;
allocating, to each pixel in the plurality of images, a label corresponding to luminance of the pixel by referring to a characteristic of the plurality of patterns;
changing the allocated label based on a time-series change of luminance of the projected plurality of patterns;
deriving a correspondence relationship between positions of the plurality of patterns in a projection plane of the projector and positions of the plurality of patterns in the acquired image based on the changed label; and
deriving three-dimensional coordinates of a surface of the target object based on the derived correspondence relationships.

16. An information processing method comprising:
acquiring an image obtained by imaging a target object onto which a pattern having a bright portion and a dark portion is projected by a projector;
detecting a boundary positioning between the bright portion and the dark portion of the pattern in the image;
allocating, to a pixel in the image, a label corresponding to luminance of the pixel by referring to a characteristic of the pattern;
changing the allocated label based on a time-series change of luminance of a projected plurality of patterns
deriving a correspondence relationship between a position of the pattern in a projection plane of the projector and a position of the pattern in the acquired image based on the changed label; and
deriving three-dimensional coordinates of a surface of the target object based on the derived correspondence relationship.

17. A non-transitory computer-readable storage medium storing a program that, when executed by a computer, causes the computer to:
acquire a plurality of images obtained by imaging a target object onto which a plurality of patterns having a bright portion and a dark portion are projected by a projector;
allocate, to each pixel in the plurality of images, a label corresponding to luminance of the pixel by referring to a characteristic of the plurality of patterns;
change the allocated label based on a time-series change of luminance of the projected plurality of patterns;
derive correspondence relationships between positions of the plurality of patterns in a projection plane of the projector and positions of the plurality of patterns in the acquired image based on the changed label; and
derive three-dimensional coordinates of a surface of the target object based on the derived correspondence relationship.

18. A non-transitory computer-readable storage medium storing a program that, when executed by a computer, causes the computer to:
acquire an image obtained by imaging a target object onto which a pattern having a bright portion and a dark portion is projected by a projector;
detect a boundary position between the bright portion and the dark portion of the pattern in the image;
allocate, to a pixel in the image, a label corresponding to luminance of the pixel by referring to a characteristic of the pattern;
change the allocated label based on a time-series change of luminance of a projected plurality of patterns
derive a correspondence relationship between a position of the pattern in a projection plane of the projector and a position of the pattern in the acquired image based on the changed label; and
derive three dimensional coordinates of a surface of the target object based on the derived correspondence relationship.

* * * * *